(12) United States Patent
Resch et al.

(10) Patent No.: US 12,279,189 B2
(45) Date of Patent: *Apr. 15, 2025

(54) METHODS AND APPARATUS FOR MODELING WIRELESS TRAFFIC AND FOR USING WIRELESS TRAFFIC INFORMATION

(71) Applicant: Charter Communications Operating, LLC, St. Louis, MO (US)

(72) Inventors: Robert Resch, Wellington, CO (US); Jason Badagliacca, Denver, CO (US); Brock Bose, Denver, CO (US)

(73) Assignee: Charter Communications Operating, LLC, St. Louis, MO (US)

(\*) Notice: Subject to any disclaimer, the term of this patent is extended or adjusted under 35 U.S.C. 154(b) by 0 days.

This patent is subject to a terminal disclaimer.

(21) Appl. No.: 18/395,563

(22) Filed: Dec. 23, 2023

(65) Prior Publication Data

US 2024/0137736 A1 Apr. 25, 2024

Related U.S. Application Data

(63) Continuation of application No. 17/364,598, filed on Jun. 30, 2021, now Pat. No. 11,856,492.

(51) Int. Cl.
  *H04W 4/33* (2018.01)
  *H04W 4/021* (2018.01)
  *H04W 16/18* (2009.01)
(52) U.S. Cl.
  CPC ............ *H04W 4/33* (2018.02); *H04W 4/021* (2013.01); *H04W 16/18* (2013.01)

(58) Field of Classification Search
  CPC ... H04L 41/147; H04L 41/145; H04L 41/149; H04L 41/22; H04L 43/0817;
  (Continued)

(56) References Cited

U.S. PATENT DOCUMENTS

| | | | | |
|---|---|---|---|---|
| 7,577,103 B2* | 8/2009 | Diaz | ..................... | H04W 24/00 370/252 |
| 8,503,336 B2* | 8/2013 | Rappaport | ............ | H04L 41/145 370/252 |

(Continued)

FOREIGN PATENT DOCUMENTS

CN   111669761 A * 9/2020 .......... H04L 41/147

*Primary Examiner* — Matthew C Sams
(74) *Attorney, Agent, or Firm* — Straub & Straub; Michael P. Straub; Stephen T. Straub

(57) ABSTRACT

Methods and apparatus for processing and reconciling data traffic utilization information from a variety of sources including client devices and service provider networks are described. The methods take into consideration that wireless devices tracking usage data may not accurately reflect the amount of usage measured by network devices. This may be because of overhead the client devices are not aware of or because different measurement techniques or accounting metrics are used by the service provider network. The methods and apparatus may and sometimes do take into consideration that while some client devices, e.g., android devices, may trach and report usage aid/or location information through the use of an application which provides such information to the network service provider, such information may not be readily available from other devices such Apple iOS devices. The described data tracking and location assignment methods are used in some embodiments to determine base station placement.

20 Claims, 27 Drawing Sheets

(58) Field of Classification Search
CPC .. H04L 43/0876; H04W 24/02; H04W 16/18; H04W 88/18; H04W 16/20; H04W 24/00; H04W 88/08
See application file for complete search history.

(56) References Cited

U.S. PATENT DOCUMENTS

| | | | |
|---|---|---|---|
| 9,860,757 B2* | 1/2018 | Udeshi | H04W 16/18 |
| 11,425,606 B1* | 8/2022 | Al-Bado | H04W 88/18 |
| 11,856,492 B2* | 12/2023 | Resch | H04W 4/021 |
| 2010/0273493 A1* | 10/2010 | Matsunaga | H04L 43/0876 |
| | | | 455/446 |
| 2017/0215085 A1* | 7/2017 | Udeshi | H04W 64/006 |
| 2023/0007450 A1* | 1/2023 | Resch | H04W 16/18 |

* cited by examiner

700

Device A:
rx:52428800,tx:500 => 52429300
rx:5242880, tx:50 => 5242930
rx:10485760,tx:100 => 10485860
rx:5242880, tx:50 => 5242930
    Total => 73401020

Device B:
rx:17476267,tx:167 => 17476434
rx:1747627 ,tx:17 => 1747644
rx:3495253 ,tx:33 => 3495286
rx:1747627 ,tx:17 => 1747644
    Total => 24467008

| seq | device_id | event_type | bssid | lat | long | tot_usage_b | rf_factor | adj_usage_b |
|---|---|---|---|---|---|---|---|---|
| 1 | A | location | alpha | -105.0 | 40.0 | null | 1.714 | null |
| 2 | A | location | alpha | -104.9 | 39.9 | null | 1.714 | null |
| 3 | A | location | alpha | -104.8 | 39.8 | null | 1.714 | null |
| 4 | A | location | alpha | -104.75 | 39.75 | null | 1.714 | null |
| 5 | A | location | alpha | -104.65 | 39.65 | null | 1.714 | null |
| 6 | A | usage | alpha | null | null | 52429300 | 1.714 | 8.986382E7 |
| 7 | A | usage | alpha | null | null | 5242930 | 1.714 | 8986382.02 |
| 8 | A | usage | alpha | null | null | 10485860 | 1.714 | 1.797276E7 |
| 9 | A | usage | alpha | null | null | 5242930 | 1.714 | 8986382.02 |
| 10 | A | location | beta | -104.0 | 39.0 | null | 1.714 | null |
| 1 | B | location | beta | -105.0 | 40.0 | null | 5.143 | null |
| 2 | B | location | beta | -105.1 | 40.1 | null | 5.143 | null |
| 3 | B | location | beta | -105.2 | 40.2 | null | 5.143 | null |
| 4 | B | location | beta | -105.25 | 40.25 | null | 5.143 | null |
| 5 | B | location | beta | -105.35 | 40.35 | null | 5.143 | null |
| 6 | B | usage | beta | null | null | 17476434 | 5.143 | 8.988130E7 |
| 7 | B | usage | beta | null | null | 1747644 | 5.143 | 8988133.09 |
| 8 | B | usage | beta | null | null | 3495286 | 5.143 | 1.797625E7 |
| 9 | B | usage | beta | null | null | 1747644 | 5.143 | 8988133.09 |
| 10 | B | location | beta | -106.0 | 41.0 | null | 5.143 | null |

1700        1702              1704           1706       1708           1710       1712
  ↷         ↓                 ↓              ↓          ↓              ↓          ↓
+----------------+-------------------+---------+------------------+--------+------------+
|ref_usage_b     |prr_tot_usage_b    |faction  |adj_prr_usage_b   |indoor  |date        |
+----------------+-------------------+---------+------------------+--------+------------+
|2.51658240E8    |2.51658240E8       |1.0      |2.51658240E8      |false   |2021-01-01  |
|1.79727640E8    |2.98275940E8       |0.602    |1.79562115E8      |false   |2021-02-01  |
|1.79727640E8    |3.98714022E8       |0.904    |3.60437476E8      |false   |2021-03-01  |
|1.79727640E8    |4.37714022E8       |0.952    |4.16703748E8      |false   |2021-04-01  |
+----------------+-------------------+---------+------------------+--------+------------+
```

2207
ASSEMBLY OF COMPONENTS
(INCLUDED IN A FIRST SERVICE PROVIDER NETWORK MANAGEMENT NODE)
(PART D)

2370 — COMPONENT CONFIGURED TO ASSIGN DATA USAGE INDICATED BY THE NORMALIZED CDCM DATA USAGE RECORDS TO LOCATIONS

2372 — COMPONENT CONFIGURED TO ASSIGN ONE OR MORE NORMALIZED DATA USAGE RECORDS CORRESPONDING TO THE FIRST WIRELESS DEVICE IN SAID FIRST SET TO A FIRST LOCATION INDICATED BY A CDCM LOCATION RECORD, E.G., A FIRST CDCM LOCATION RECORD, CORRESPONDING TO THE FIRST WIRELESS DEVICE

2374 — COMPONENT CONFIGURED TO ASSIGN ONE OR MORE NORMALIZED DATA USAGE RECORDS CORRESPONDING TO THE SECOND WIRELESS DEVICE IN SAID FIRST SET TO A SECOND LOCATION INDICATED BY A CDCM LOCATION RECORD, E.G., A SECOND CDCM LOCATION RECORD, CORRESPONDING TO THE SECOND WIRELESS DEVICE

2376 — COMPONENT CONFIGURED TO ASSIGN ONE OR MORE NORMALIZED DATA USAGE RECORDS CORRESPONDING TO THE NTH WIRELESS DEVICE IN SAID FIRST SET TO A Nth LOCATION INDICATED BY A CDCM LOCATION RECORD, E.G., A NTH CDCM LOCATION RECORD, CORRESPONDING TO THE NTH WIRELESS DEVICE

2378 — COMPONENT CONFIGURED TO REMOVE FROM CONSIDERATION DATA USAGE ASSIGNED TO INDOOR LOCATIONS

2380 — COMPONENT CONFIGURED TO ASSIGN DATA USAGE AMOUNTS INDICATED BY THE NORMALIZED FIRST SET OF CDCM USAGE RECORDS TO GEOSPATIAL AREAS (E.G., GEOSPATIAL BINS)

2382 — COMPONENT CONFIGURED TO SCALE ON A PER GEOSPATIAL AREA (E.G. PER GEOSPATIAL BIN) BASIS, THE SUM OF THE DATA ASSIGNED TO EACH INDIVIDUAL GEOSPATIAL AREA (E.G., GEOSPATIAL BIN) TO ADJUST FOR NON-CM CLIENT DEVICES

2383 — COMPONENT CONFIGURED TO OPTIONALLY DETERMINE ON A PER GEOSPATIAL AREA (E.G., GEOSPATIAL BIN) BASIS DATA USAGE FOR ADDITIONAL TIME PERIODS, E.G., ADDITIONAL DAYS OF THE YEAR

2384 — COMPONENT CONFIGURED TO DETERMINE ONE OR MORE WIRELESS NETWORK DEVICE (E.G., ACCESS POINT SUCH AS CITIZENS BROADBAND RADIO SERVICES DEVICE (CBSD) BASE STATION) PLACEMENT LOCATIONS BASED ON THE ASSIGNED DATA USAGE TO LOCATION INFORMATION

2386 — COMPONENT CONFIGURED TO FOR EACH INDIVIDUAL GEOSPATIAL AREA (E.G., GEOSPATIAL BIN) GENERATE A SUM OF THE DATA ASSIGNED TO THE INDIVIDUAL GEOSPATIAL AREA (E.G., GEOSPATIAL BIN)

2388 — COMPONENT CONFIGURED TO IDENTIFY A GEOSPATIAL AREA (E.G., GEOSPATIAL BIN) HAVING A HIGHER DATA SUM ASSIGNED TO IT THAN ANOTHER GEOSPATIAL AREA (E.G., GEOSPATIAL BIN) AS ONE OF THE WIRELESS NETWORK DEVICE PLACEMENT LOCATIONS

2390 — COMPONENT CONFIGURED TO DEPLOY A WIRELESS NETWORK DEVICE (E.G., A CBSD BASE STATION) AT ONE OF THE DETERMINED WIRELESS NETWORK DEVICE PLACEMENT LOCATIONS

FIGURE 22D

| FIGURE 22A | FIGURE 22B | FIGURE 22C | FIGURED 22D |

FIGURE 22 ns and more particularly to modeling wireless traffic and
METHODS AND APPARATUS FOR MODELING WIRELESS TRAFFIC AND FOR USING WIRELESS TRAFFIC INFORMATION

RELATED APPLICATIONS

The present application is a continuation of U.S. patent application Ser. No. 17/364,598 filed on Jun. 30, 2021 and published as US 2023-0007450 A1 on Jan. 5, 2023, said application and publication hereby being expressly incorporated by reference in their entirety.

FIELD

The present application relates to wireless communications and more particularly to modeling wireless traffic and for using wireless traffic information, e.g., in making hardware deployment decisions.

BACKGROUND

Various sources of network traffic information are available. For example, access points such as base stations may track and report data usage information, e.g., for network management and/or billing reasons. In the case where a base station operator is contracted with to provide services from multiple customers of a contracting party, the contracting party may receive information on network usage, based on base station usage by the contracting party, but may or may not have precise information about the location of the base stations for which use information is provided. In addition, wherein usage information corresponding to a base station indicates that the wireless device was in the coverage area of the base station which reported the usage, where the wireless device was within the base station coverage area is likely unknown from the base station usage information. Accordingly, base station usage information while providing some information can leave a lot of uncertainty with regard to wireless device data usage with respect to precise device location information which can be important when considering where to deploy additional access points, e.g., base stations. For example, when planning to deploy base stations, e.g., small cells, to reduce the load on a service provider's network and shift it to the contracting party's own network detailed information about the location of user devices and data usage information may be needed making base station usage information by itself insufficient in many cases for reliably modeling data traffic to a level different than that of the reporting network, e.g., to facilitate small cell location planning and deployment.

In addition to base station usage information, another source of data usage information can be, and sometimes is, an application running on one or more mobile devices which track device data usage. Android devices often support such data usage applications while iOS devices and/or Apple often block the reporting and/or sharing of data usage to wireless service providers.

Such wireless device provided data usage information can be useful but may not accurately track the actual data usage from a network perspective and may differ from base station reported usage for a variety of reasons. In addition, since only a subset of devices using a network, e.g., Android devices, may provide data usage information there is often a discrepancy between total base station reported data usage and the amount of data usage reported by wireless devices. Furthermore, the time periods for which data usage are reported by wireless devices may or may not coincide clearly with base station reported data usage time periods and in many cases the data usage tracking and reporting periods used by wireless devices and base stations will differ.

In addition to reporting data usage, at least some individual devices may report their location at various points in time, e.g., based on various events at an individual wireless device. Unfortunately, wireless devices often provide their location information in response to different events than those that trigger data usage reporting. This makes it difficult to correlate wireless device provided data usage information to wireless device provided location information.

If the above issues weren't enough to make traffic modeling based on data usage information difficult, for the traffic models to be useful in considering where particular sets of hardware, e.g., access points such as small base stations, should be deployed, it may be important to take into consideration that an access point being deployed may be or is likely to service some types of traffic but not others. For example, outdoor access points which use signaling which has difficulty penetrating walls may be able to service wireless data traffic from outdoor devices but not indoor wireless devices. However base stations which use signaling, e.g., cellular LTE signaling capable of penetrating walls, may be able to service both indoor and outdoor traffic. Accordingly, in some but not all cases, it can be useful if distinctions could be made when modeling traffic in an area whether the traffic is from an indoor or outdoor device.

From the above it should be appreciated that differences between the sources of traffic model information present numerous technical problems with regard to the use of such data to generate traffic models which are sufficiently reliable for network planning and/or making decisions as to where to place wireless network components in a hardware and/or cost efficient manner.

In view of the above, it should be appreciated that there is a need for methods and/or apparatus which can be used to model and/or predict wireless traffic in one or more geographic areas. It would be desirable if the methods and/or apparatus could use a variety of different data traffic sources in making the model and/or if the methods or apparatus could take into consideration the fact that data and/or location reporting periods may be different. Accordingly, it should be appreciated that traffic modeling methods that can be used to facilitate efficient hardware deployment of access points, e.g., base stations, and/or other network elements are both important and useful.

SUMMARY

Methods and apparatus and apparatus for processing and reconciling data traffic utilization information from a variety of sources including client devices and service provider networks are described.

The described methods take into consideration that wireless devices tracking usage data may not accurately reflect the amount of usage measured by network devices. This may be because of overhead the client devices are not aware of or because different measurement techniques or accounting metrics are used by the service provider network. The methods and apparatus may, and sometimes do, take into consideration that while some client devices, e.g., android devices, may track and report usage and/or location information through the use of an application which provides such information to the network service provider, such information may not be readily available from other devices such Apple iOS devices. The described data tracking and location assignment methods are used in some embodiments to determine hardware placement, e.g., access point and/or base station placement.

Data usage reported by client devices which support a connection manager application is scaled based on the amount of data a network service provider reports being used. Location information provided by the client devices is then allocated based on client device provided location information to geographic locations.

Depending on whether a distinction is to be made between indoor and outdoor traffic, in some embodiments once data usage has been assigned to locations, data usage corresponding to indoor location may be intentionally excluded from further consideration. Such an implementation is useful when deciding where to position access points or base stations intended to capture outdoor data traffic. One such situation may be, and sometimes is, when attempting to determine traffic which may be served by a CBRS device which services outdoor devices but is unlikely to capture traffic from indoor devices.

Once the data traffic from wireless devices, e.g., client devices such as UEs, that provide both location and data usage information has been assigned to locations, the traffic information if further processed to allocate it to geospatial areas, e.g., hex shaped areas, sometimes also referred to as bins, since one bin is used to collect data traffic information for one corresponding hex shaped area in some embodiments.

Data usage and/or the amount of data allocated to bins can be, and sometimes is, adjusted to take into consideration traffic due to devices which do not provide data and location information. This is done by taking into consideration service provider reported traffic corresponding to devices which do not supply their data and location information, e.g., because they do not support a connection manager application.

Data usage can be, and sometimes is, generated on a daily basis and then for an extended period of time, e.g., a year. Smoothing of data over the extended period of time may be used to obtain a more realistic estimate of data usage in geospatial regions despite daily fluctuations in data traffic.

Based on estimated data traffic, decisions with regard to where to place network hardware can be, and sometimes are, made. In this way base stations or other devices can be placed by a first network provider at locations where they are likely to be able to service an amount of traffic which can make the deployment effective in terms of hardware utilization particularly where the goal is to move some traffic away from a second service provider network onto a first service provider network to avoid costs and/or service issues associated with customers having to use the second service provider network to obtain service.

The methods and apparatus are well suited for determining access point/base station placement in cases where a MVNO seeks to start building out a physical network of its own to reduce the need for the MVNO's customers to use a partner, e.g., second service provider network, to obtain service.

While various techniques and methods for determining traffic utilization are described to facilitate access point location selection and placement, the methods and apparatus can be used for a wide variety of applications including making other hardware or capacity related acquisition or placement decisions.

An exemplary method of using wireless data usage information from a variety of sources, in accordance with some embodiments, includes: accessing a first set of client device connection manager data (CDCM) usage records including data usage information corresponding to a first plurality of wireless devices and a first time period, said data usage information being data usage information that was measured by wireless devices in said first plurality of wireless devices; normalizing the first set of CDCM usage records for the first time period by scaling the CDCM usage records on an individual device basis based on per device usage information for the first time period indicated in a first set of second service provider data usage records provided by a second network used by the first plurality of devices; assigning data usage indicated by the normalized CDCM data usage records to locations; determining one or more wireless network device placement locations based on the assigned data usage to location information; and deploying a wireless network device at one of the determined wireless network device placement locations.

Numerous variations on the described methods and apparatus are possible and while several embodiments are described in detail is should be appreciated that the full set of detailed steps need not be used in all embodiments with many of the features and determinations being useful even if not used with the other features and steps.

The detailed description which follows describes additional features, details and embodiments which can be used alone or in combination.

BRIEF DESCRIPTION OF THE FIGURES

FIG. 2 comprises the combination of FIG. 2A, FIG. 2B and FIG. 2C.

FIG. 8 is a table illustrating exemplary location and usage events, exemplary generated normalization factors, total usage amounts, and adjusted usage based on the generated normalization factors.

FIG. 22D is a fourth part of a drawing of an exemplary assembly of components which may be included in an exemplary first service provider network management node in accordance with an exemplary embodiment.

FIG. 22 comprises the combination of FIG. 22A, FIG. 22B, FIG. 22C and FIG. 22D.

DETAILED DESCRIPTION

Figure 1:
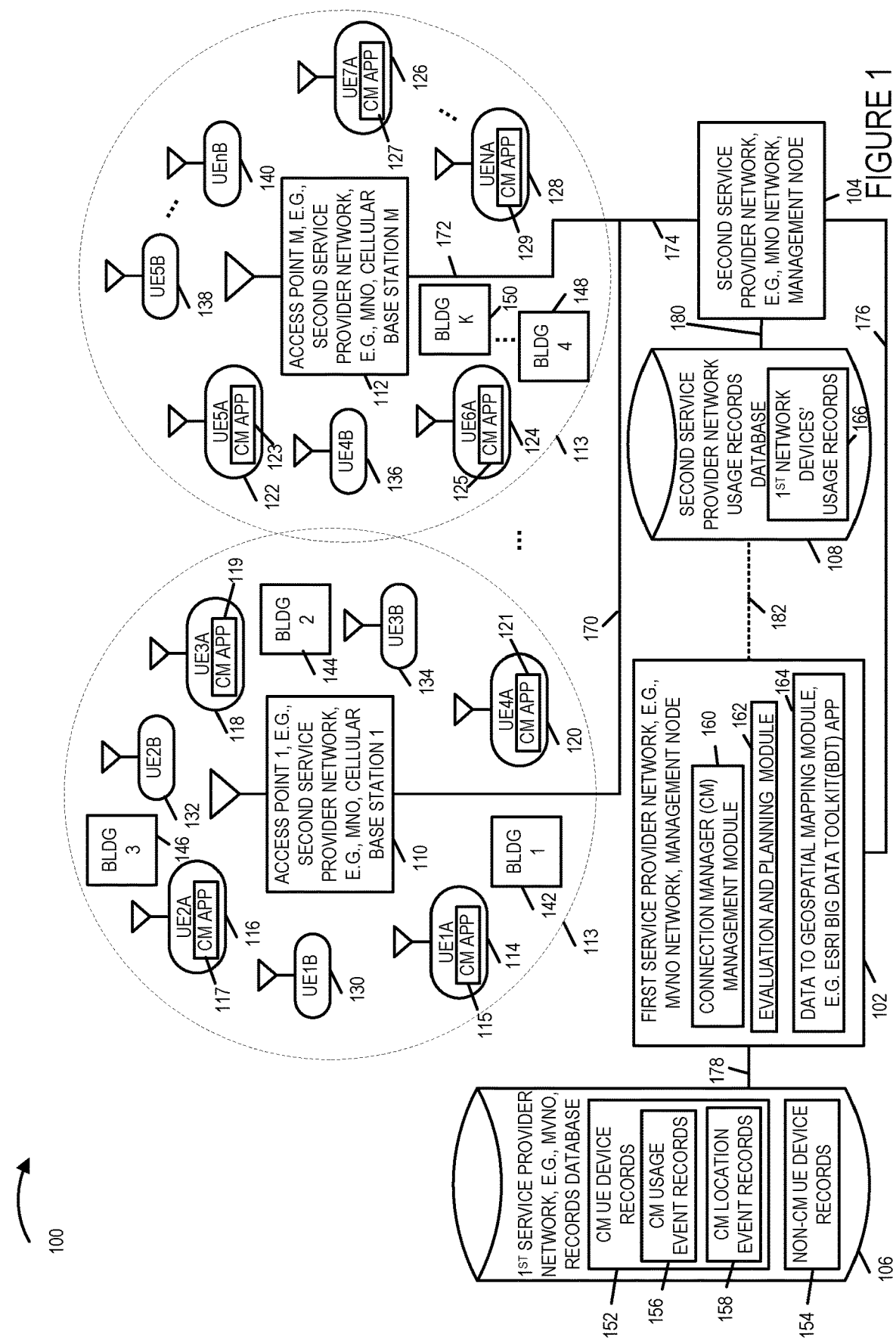
FIG. 1 is a drawing of an exemplary communications system in accordance with an exemplary embodiment/

FIG. 1 is a drawing of an exemplary communications system 100 in accordance with an exemplary embodiment. Exemplary system 100 includes network management node 102, which is a first service provider network, e.g. a mobile virtual network operator (MVNO) network, management node, network management node 104, which is a second service provider network, e.g., a mobile network operator (MNO) network, management node, a first service provider network records database 106, and a second service provider network usage records database 108, a plurality of access points (access point 1 110, e.g., second service provider network cellular base station 1, . . . , access point M 112, e.g. second service provider network cellular base station M), and a plurality of user equipment (UE) devices (UE1A 114, UE2A 116, UE3A 118, UE4A 120, UE5A 122, UE6A 124, UE7A 126, . . . , UENA 128, UE1B 130, UE2B 132, UE3B 134, UE4B 136, UE5B 138, UE6A 124, . . . , UEnB 140), which are mobile client devices which correspond to the first service provider network, e.g., the user's of these UEs subscribe the first service provider network. UEs (UE1A 114, UE2A 116, UE3A 118, UE4A 120, UE5A 122, UE6A 124, UE7A 126, . . . , UENA 128) each include a connection manager (CM) application (115, 117, 119, 121, 123, 125, 127, . . . , 129), respectively. In some embodiments, the UEs (UE1A 114, UE2A 116, UE3A 118, UE4A 120, UE5A 122, UE6A 124, UE7A 126, . . . , UENA 128) are android (droid) devices. In some embodiments, the UEs (UE1B 130, UE2B 132, UE3B 134, UE4B 136, UE5B 138, UE6A 124, . . . , UEnB 140) are iOS devices.

First service provider network management node 102 includes a connection manager (CM) management module 160, a planning module 162 and an ESRI Big Data Tool (BDT) application 164. Connection manager management module 160 interfaces with the CM APPs (115, 117, 119, 121, 123, 125, 127, . . . , 129) of UEs (114, 116, 118, 120, 122, 124, 126, 128) and receives CM usage event usage records and CM location event records from the UEs (114, 116, 118, 120, 122, 124, 126, . . . , 128). The CM management module 160 stores the received CM usage event records and the received CM location event records in the CM UE device records 152 of 1st service provider network records database 106. The second service provider network management node 104 receives usage reports from the APs (110, . . . , 112) reporting usage of UE devices. For example, second service provider network management node 104 receives a report from AP1 110 reporting usage of UEs (114, 116, 118, 120, 130, 132, 134) and a report from AP2 112 reporting usage of UEs (122, 124, 126, 128, 136, 138, 140). The second service provider management node 104 generates and stores usage records for the 1st networks devices (114, 116, 118, 120, 122, 124, 126, 128, 130, 132, 134, 136, 140), which includes both CM enabled devices (e.g., android devices) and non-CM devices (e.g. IoS devices) in 1st network devices' usage records 166 of second service provider network usage records database. The usage records in the second service provider network usage records database 108 are considered to be more accurate than the CM usage event records 156 in CM UE device records 152 of 1st service provider network records database.

Evaluation and planning module 162, in some embodiments, accesses usage records from CM usage event records 156 and location event records from CM location event records 158 from the 1st service provider network records database 106, accesses usage records from 1st network devices' usage records 166 of second service provider usage records database 108, generates normalization factors, normalizes CM usage data, associates locations with CM usage events, determines indoor/outdoor status of CM usage events, maps usage events to geospatial bins, aggregates usage information, performs data smoothing operations, e.g. filtering, performs usage adjustments to take into account non-CM UE devices, determines a traffic density, and determines traffic, for each of a plurality of different locations e.g., for one or more time intervals, and determines one or more locations at which to deploy an access point, e.g., a CBSD base station based on the traffic determination(s).

First service provider network records database 106 includes CM UE device records 152 and non-CM UE device records 154. The CM UE device records 152 includes CM usage event records 156 and CM location event records 158. Second service provider network usage records database 108 includes 1st network devices' usage records 166.

Access point 1 110 is coupled to second service provider network management node 104 via links 170, 174. Access point M 112 is coupled to second service provider network management node 104 via links 172, 174. Second service provider network management node 104 is coupled to second service provider network usage records database 108 via communications link 180. First service provider network management node 102 is coupled to first service provider network records database 106 via communications link 178. The first service provider network management node 102 is coupled to the second service provider network management node 104 via communications link 176. In some embodiments, the first service provider network management node 102 is coupled to second service provider network usage records database via optional communications link 182, e.g., allowing the first service provider network management node 102 to directly access the second service provider network usage records database 108. In some embodiments, the first service provider network management node 102 accesses the second service provider network usage records database 108 indirectly, e.g., via a path including communications link 176, second service provider network management node 104 and communications link 180.

Throughout the geographical area corresponding to the access point coverage areas (111, . . . , 113) of system 100, there are also a plurality of buildings (building 1 142, building 2 144, building 3 146, building 4 148, . . . , building K 150).

The first service provider network, e.g., a MVNO network, is a partner to the second service provider network, e.g., a MNO network, which owns licensed spectrum and access point, e.g. cellular base station, infrastructure.

Figure 2A:
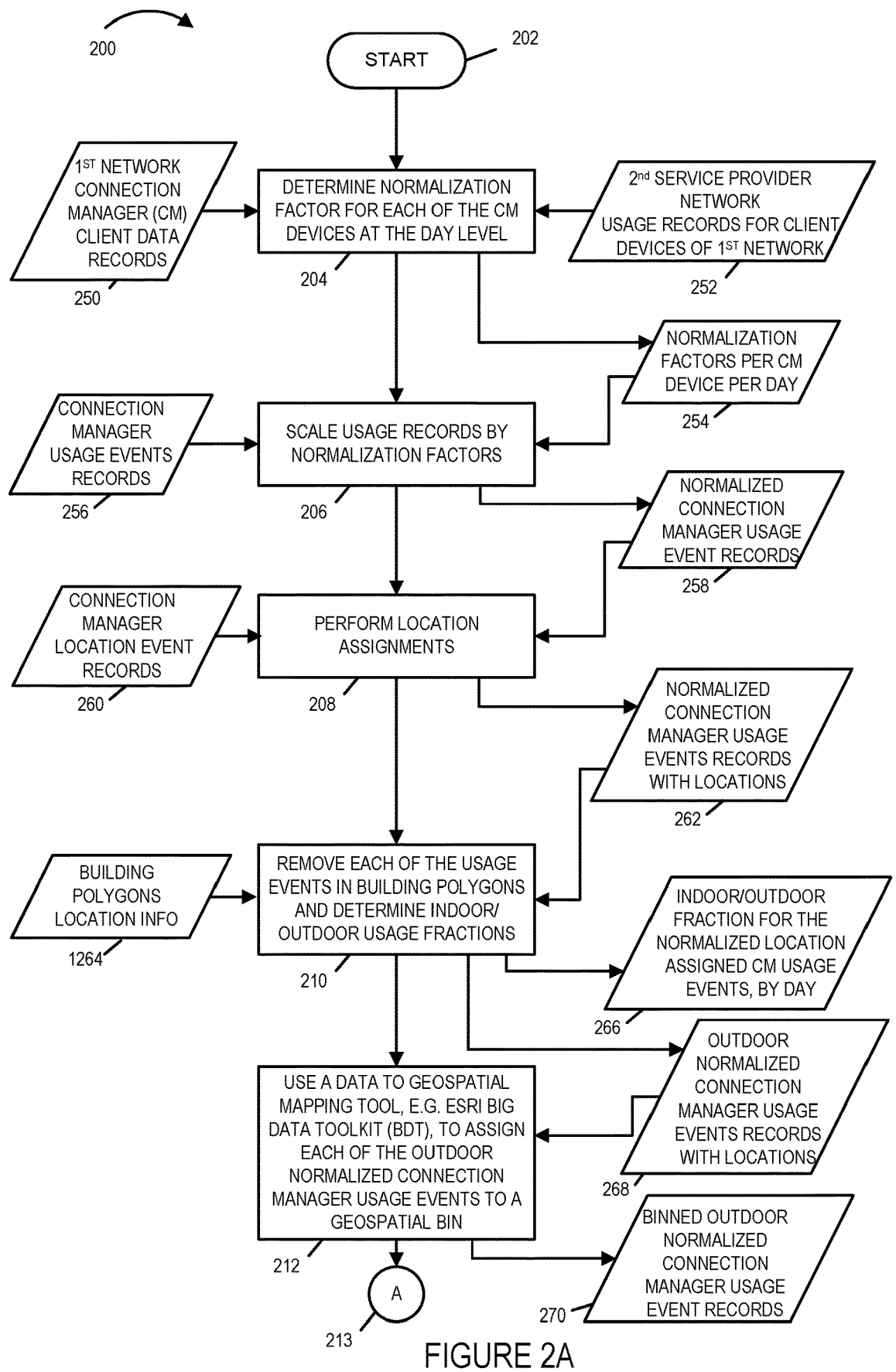
FIG. 2A is first part of a flowchart of an exemplary method of using wireless data usage information from a variety of sources in accordance with an exemplary embodiment.
Figure 2B:
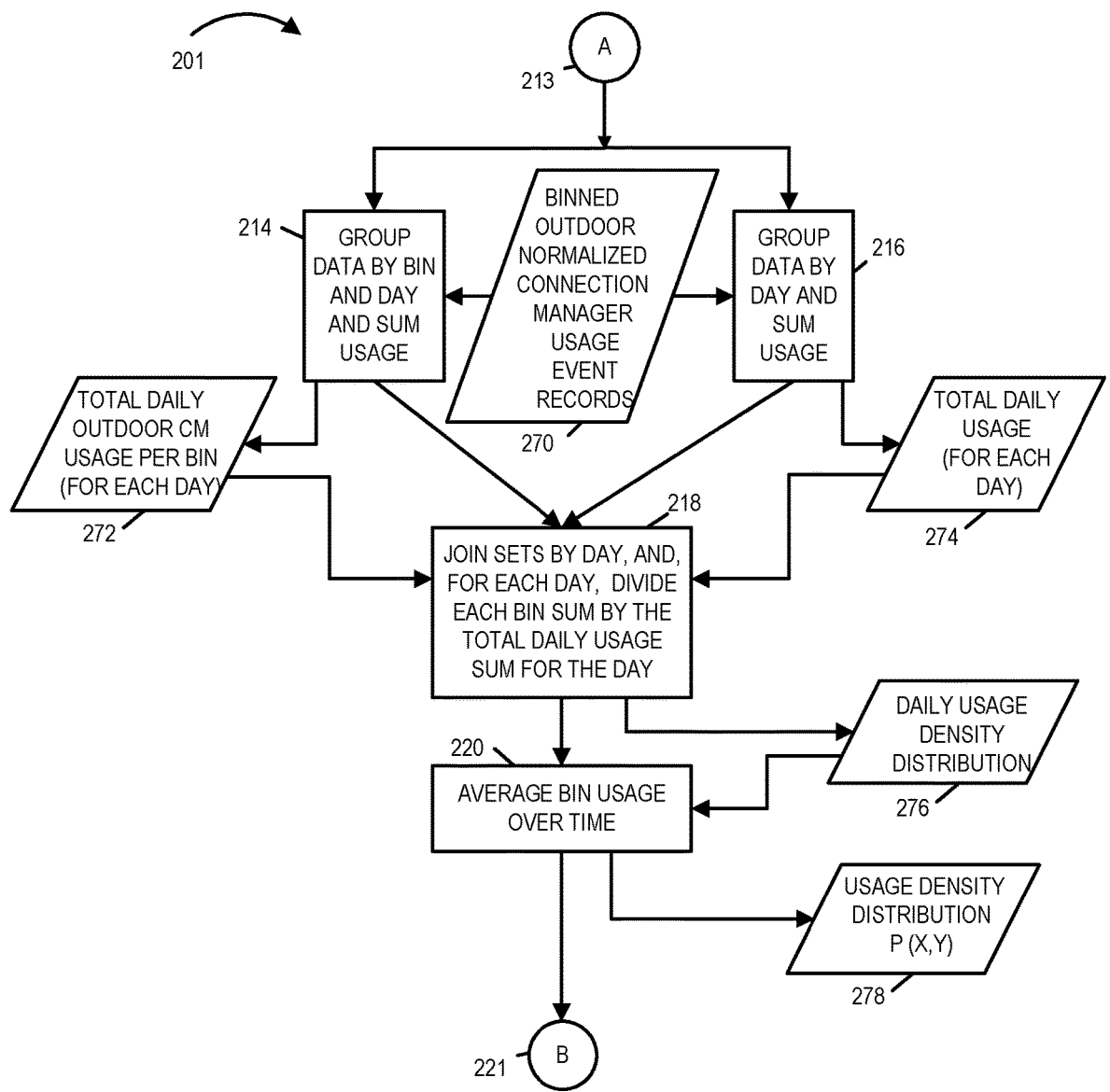
FIG. 2B is second part of a flowchart of an exemplary method of using wireless data usage information from a variety of sources in accordance with an exemplary embodiment.
Figure 2C:
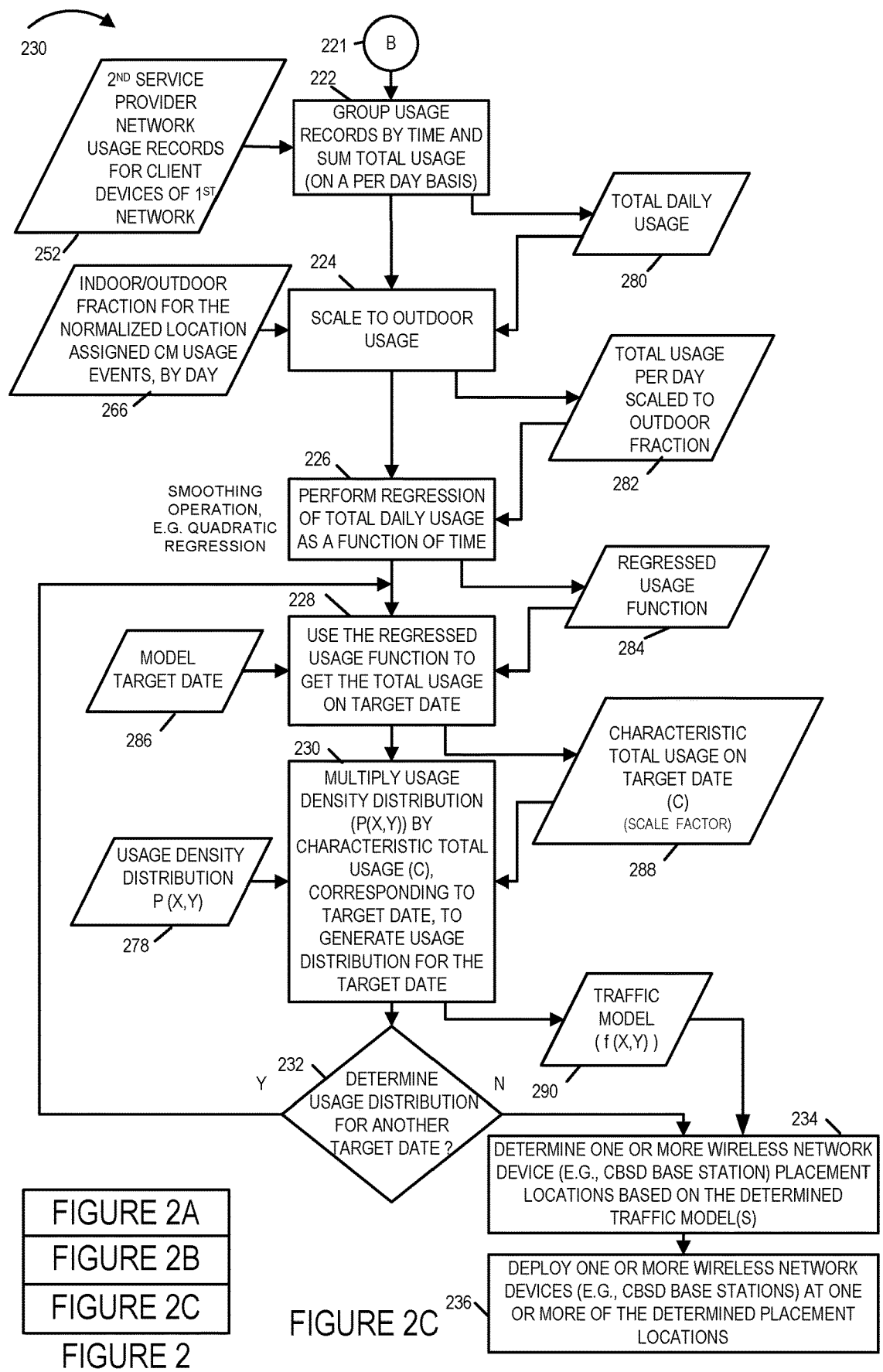
FIG. 2C is third part of a flowchart of an exemplary method of using wireless data usage information from a variety of sources in accordance with an exemplary embodiment.

FIG. 2 comprising the combination of FIG. 2A, FIG. 2B and FIG. 2C, is a flowchart 200 of an exemplary method of using wireless data usage information from a variety of sources, e.g., wireless data usage information from connection manager usage event records from a first service provider network (e.g., MVNO) records database and wireless data usage information from a second service provider network (e.g., MNO) records database, in accordance with an exemplary embodiment. Operation starts in step 202 in which a first service provider network, e.g., a MVNO network, management node, e.g., node 102 of FIG. 1, is powered on and initialized. Operation proceeds from step 202 to step 204.

In step 204 the network management node determines a normalization factor for each of a plurality of connection management client devices on a per day basis, using first network connection manger (CM) client data records 250 and second service provider network usage records 252 for client devices of the first network. The output of step 254 are normalization factors per CM device per day. Operation proceeds from step 204 to step 206.

In step 206 the management node scales connection manger usage event records by normalization factors which in this case are scale factors. The scaling makes data records comparable across clients. The output of step 206 is normalized connection manager usage event records. At this stage the "normalized" usage is now comparable across devices. Operation proceeds from step 206 to step 208.

In step 208 the management node performs location assignments for some or all of the normalized connection manager usage event records using connection manager location event records 260. In some embodiments, a connection manager usage event is assigned to a location of a prior connection manager location event. The output of step 208 is normalized connection manager usage event records with locations 262. Operation proceeds from step 208 to step 210.

In step 210 the management node removes each of the usage events in building polygons and determines indoor/outdoor fractions. In step 210 for each usage event being processed in normalized connection manager usage events records with locations 262, the management node determines whether or not the location assigned to the usage event corresponds to one of the locations in building polygon location information 1264. Usage events determined to in buildings are removed from normalized connection manager usage events records with locations 262 and the result is outdoor normalized connection manager usage events records with locations 268. After determination of which events are indoor and which events are outdoor, for each day, the sum of normalized CM device usage for indoor events is determined and the sum of CM device usage of normalized CM device usage for outdoor events is determined, and an indoor/outdoor fraction of normalized CM device usage is determined. The results are stored in indoor/outdoor fraction for normalized location assigned CM usage events records 266, with a determined indoor/outdoor fraction for each day. Operation proceeds from step 210 to step 212. In step 212 the management node uses a data to geospatial mapping tool to assign each of the outdoor normalized connection manager usage events to a geospatial bin. In one embodiment, the data to geospatial mapping tool is an ESRI Big Data Toolkit (BDT). The input to step 212 is outdoor connection manager usage events records with locations 268, and the generated output from step 212 is binned outdoor normalized connection manger usage event records 270. Operation proceeds from step 212, via connecting node A 213 to steps 214 and 216.

In step 214 the management node groups data from binned outdoor normalized connection manager usage event records 270 by bin and day and then sums usage generating a total daily outdoor CM usage per bin for each day 272. In step 216 the management node groups data from binned outdoor normalized connection manager usage event records 270 by day and sums the usage generating a total usage for each day 274. Operation proceeds from steps 214 and 216 to step 218.

In step 218 the management node joins the sets (total daily outdoor usage per bin, and total daily usage) by day, and for each day, divides each bin sum by the total daily usage sum for the day. The output of step 276 is a daily usage density distribution, which includes a fractional usage value for each bin for each day. Operation proceeds from step 218 to step 220.

In step 220 the management node averages bin usage over time. For example, in step 220, for each bin, the corresponding daily usage density distribution values stored in information 276 are summed and divided by the number of days which are being evaluated. In some embodiments, the number of days being evaluated is 365 corresponding to a year. The averaging of step 220 gets rid of noise. The output of step 220 is usage density distribution P(X, Y) 278. Operation proceeds from step 220, via connecting node B 221 to step 222.

In step 222, the management node groups usage records from 2nd service provider usage records for client devices of 1st network 252 by time and sums total usage on a per day basis. Usage data from both CM (Droid) devices and non-CM devices (IoS and other non-CM devices), which are client devices of the 1st network are processed in step 222. The output of step 222 is a total daily usage 280, which includes a total daily usage value for each day. Operation proceeds from step 222 to step 224.

In step 224, the management node scales the total daily usage information 280 to generate total usage per day usage scaled to outdoor fraction 282. In step 224, for each day being processed, the total daily usage value for that day from information 280 is scaled based on the indoor/outdoor fraction for that day obtained from indoor/outdoor fraction for the normalized location assigned CM usage events, by day information 266. For example, total daily usage value for the day scaled to outdoor fraction=total daily usage value for that day from information 280/(1+indoor/outdoor fraction based on CM data for that day). Operation proceeds from step 224 to step 226.

In step 226 the management node performs a regression of the total usage per day scaled to outdoor fraction 282 as a function of time and obtains as a result a regressed usage function 284. The regression of step 226 is a smoothing operation. In some embodiments, the regression is a quadric regression. Operation proceeds from step 226 to step 228. In step 228 the management node uses the regressed usage function 284 a selected model target date 286 to generates a characteristic total usage on the target date (C) 288. The characteristic total usage on the target date (C) 288 is an estimated total outdoor usage for 1st network client devices for a particular day (based on 2nd service provider usage records for 1st service provider client devices (both CM and non-CM clients devices). Operation proceeds from step 228 to step 230.

In step 230, the management node multiples the usage density distribution (P(X,Y)) by the characteristic total usage (C), corresponding to the target date, to generate a usage distribution f(X,Y) for the target date. Usage distribution f (X,Y) is a traffic model, which gives absolute outdoor usage at different locations for the target date.

Operation proceeds from step 230 to step 232. If the usage distribution f (X,Y) 290 is to be obtained for another target date, then another target date (e.g. another day) is selected and input to model target date input 286, and operation proceeds from step 232, to the input of step 228. Step 228 is performed to obtain a characteristic total usage (C) 288 on the new target date, and in step 230 the usage density distribution P(X,Y) is multiplied by the new characteristic total corresponding to the new target date, to obtain the traffic model f(X,Y) 290 for the new target date.

If the determination of step 232 is that a usage distribution is not to be determined for another date, then operation proceeds from step 232 to step 234. In step 234 the management node determines one or more wireless network device, e.g. CBSD base station, placement locations based on the determined traffic model(s). Operation proceeds from step 234 to step 236. In step 236 the management node deploys one or more network devices, e.g. CBSD base stations, at one or more of the determined placement locations, e.g. the management node generates and sends instructions and/or a work order to deploy one or more network devices at one or more of the determined placement locations.

In some embodiments, steps 228 and 230 are performed for each of one or more target dates, e.g., each of the 365 days of a year. The obtained one or more traffic models 290 are used, in some embodiments, to determine locations, e.g., high data usage locations, at which the 1st network is to install its own base station, e.g., Citizens Broadband Radio Services Device (CBSD) base stations.

Various aspects and/or features of some embodiments of the present invention are discussed below. The below example details the construction of an exemplary traffic model for determining deployment locations of one or more wireless network devices, e.g., CBSD base stations, from a combination of: i) second service provider network, e.g. mobile network operator (MNO), data usage records, and ii) first service provider network, e.g. mobile virtual network operator (MVNO), connection manager (CM) usage event records and CM location event records.

An overview of record type and their properties will now be described. Second service provider network data usage records include billing records, sometimes referred to a PRRs, from the third-party MNO, that report the amount of usage from each first service provider network device associated with the base station to which the device was connected.

Each record records the total data transmitted to, and received from, a mobile device during a session. A session is defined as the period between when mobile device connects and disconnects from a tower.

Each record contains the (Basic Service Set Identifier) BSSID of the tower.

Each record contains International Mobile Equipment Identity Number (IMEI) of the device. The record contains no location information (not even information regarding the location of the tower). The second service provider usage records (e.g. PRRs) are considered truth regarding total usage by device.

Connection Manager (CM) events will now be described. Connection Manager (CM) is an application that runs on first service provider mobile devices that collects quality of service telemetry data from client devices. This information is sent back to a first service provider management node as a collection of events (messages transmitting information on specific activities) via normal internet protocols. Events that represent instantaneous actions (start of a cellular connection, a location update, etc.) contain the devices latitude and longitude at the time the event occurred. Events that represent time integrated information (total usage over a period of time) do not contain location information.

For simplicity, in the discussion that follows all events that contain location information will be referred to as location events, and all events containing usage information will be referred to as usage events.

The usage events in CM have known limitations in terms of reporting total usage. That is, the usage reported by CM is known to both over report and under report usage.

The reported CM usage is believed to be consistent for a device. That is, if CM reports that a device used twice as much information in one location as another, then it probably did, but the absolute usage is probably not correct.

The CM events contain a device identifier that can be linked to the devices IMEI.

The CM Cellular events contain the BS SID of the tower that the device was communicating with.

CM is only installed on Android devices. There are no CM events from iOS customers.

Figure 3:
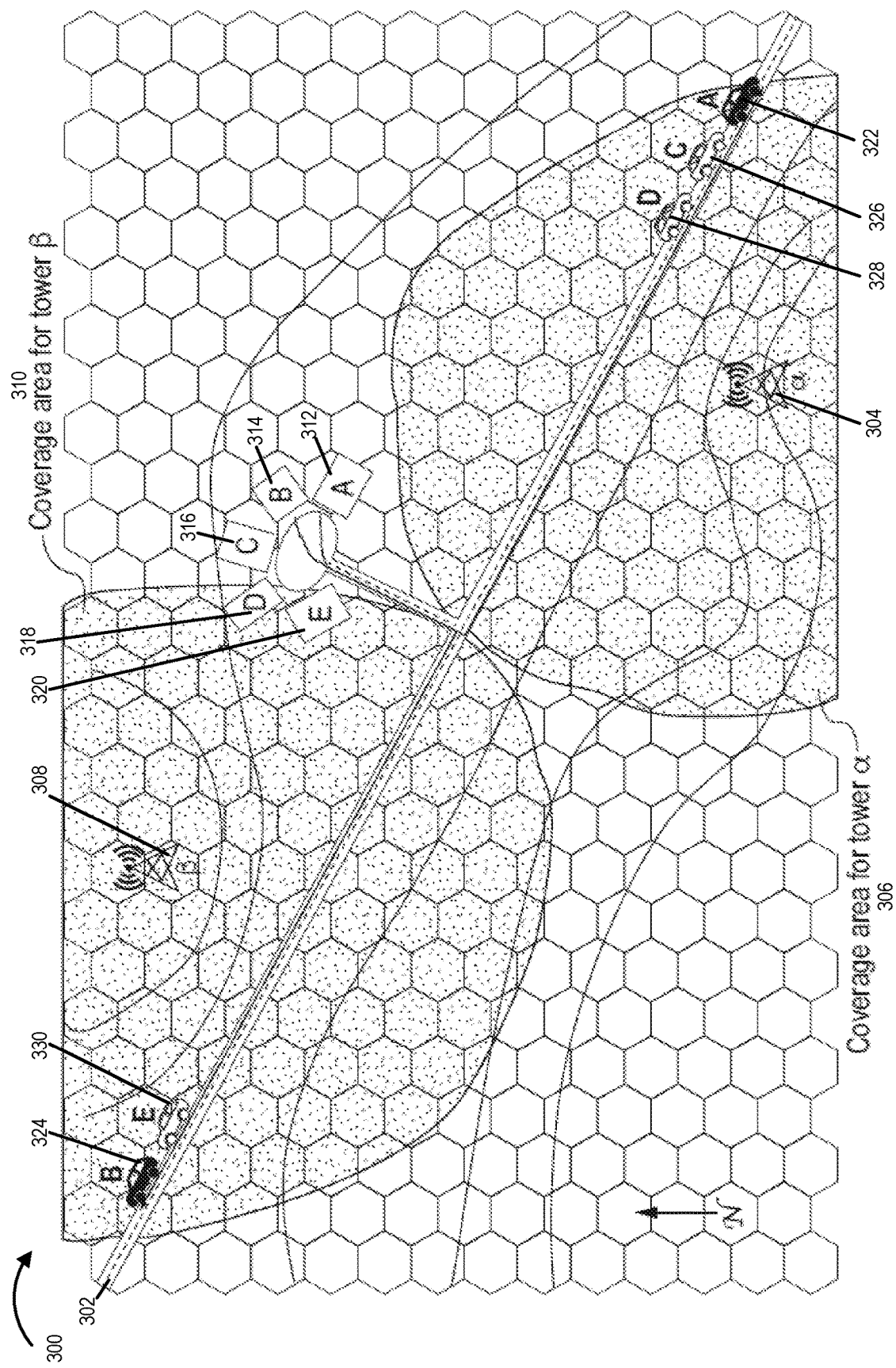
FIG. 3 is a drawing which illustrates an exemplary geographic area including a road, cell tower α, coverage area for cell tower α, cell tower β, coverage area for cell tower β, and a cluster of houses.

An exemplary scenario will now be described. In this scenario it will be shown how the second service provider network, e.g. MNO, data usage records, e.g., PRRs, and first service provider network CM Event records will be used to estimate expected spatial distribution of first service provider network customers usage along a road 302 running between two towns. FIG. 3 is drawing 300 which illustrates an exemplary geographic area including road 302, cell tower α 304, coverage area 306 for cell tower α, cell tower β 308, coverage area 310 for cell tower β, a cluster of houses (A 312, B 314, C 316, D 318, E 320).

In this set up, each house in the cluster of houses (house A 312, house B 314, house C 316, house D 318, and house E 320), each has a single first service provider network customer. The customers in house A 312 and house B 314 use Android devices (and thus are covered by CM) and the customers in house C 316, house D 318 and house E 320 use iOS devices. Every morning a member from each household gets up and goes to work, taking the main road 302 either North West or South East. During their drive, cellular coverage is provided by tower α 304 in the South East and tower β 308 in the North West.

Additionally, the exact location of towers α 304 and βb 308 are not known. For this process it is sufficient to know their location accurately enough to place them with a specific county, which can be determined by taking the median latitude and longitude of all the CM location events associated with the tower. It should also be noted that the coverage area (306, 308) for towers (α 304 and β 308), respectively, are not known, and in general are neither continuous nor mutually exclusive.

For simplicity we treat this process as being done globally. For processing purposes, in some embodiments, it is done on a county-by-county basis. Input data can be, and sometimes is, filtered by using the latitude/longitude locations of the CM events and the approximate locations of the towers.

For this exemplary scenario, assume everyone uses only a navigation app that transmits and receives continuously during their trip, and that everyone travels at a constant rate so that the expected usage from each customer should be constant per unit length along the road.

Also assume, with no loss of generality, that the cellular devices from customers A-E are the only devices in the analysis, and that towers α 304 and β 308 are the only towers in the analysis. Given that there is only one device and customer per house, all devices and customers will be labeled with their house letter. For example, customer A, lives in house A, and uses cellular device A. Drawing 300 of FIG. 3 further illustrates: customer A with cellular device A (which is an android device with CM), as represented by car symbol A 322 leaving home A 312; customer B with cellular device B (which is an android device with CM), as represented by car symbol B 324 leaving home B 314; customer C with cellular device C (which is an iOS device), as represented by car symbol C 326 leaving home C 316; customer D with cellular device D (which is an iOS device), as represented by car symbol D 328 leaving home D 318; and customer E with cellular device E (which is an iOS device), as represented by car symbol E 330 leaving home E 320.

It will be initially assumed that the density and usage of iOS devices mirrors that of Android devices, as was initially assumed for the traffic model. Later we will describe the uncertainty that this introduces.

Construction of the traffic model proceeds with the following steps:
1. Normalization and location assignment,
2. Usage littering, binning, aggregation and averaging, and
3. Usage scaling and projection.

Figure 4:
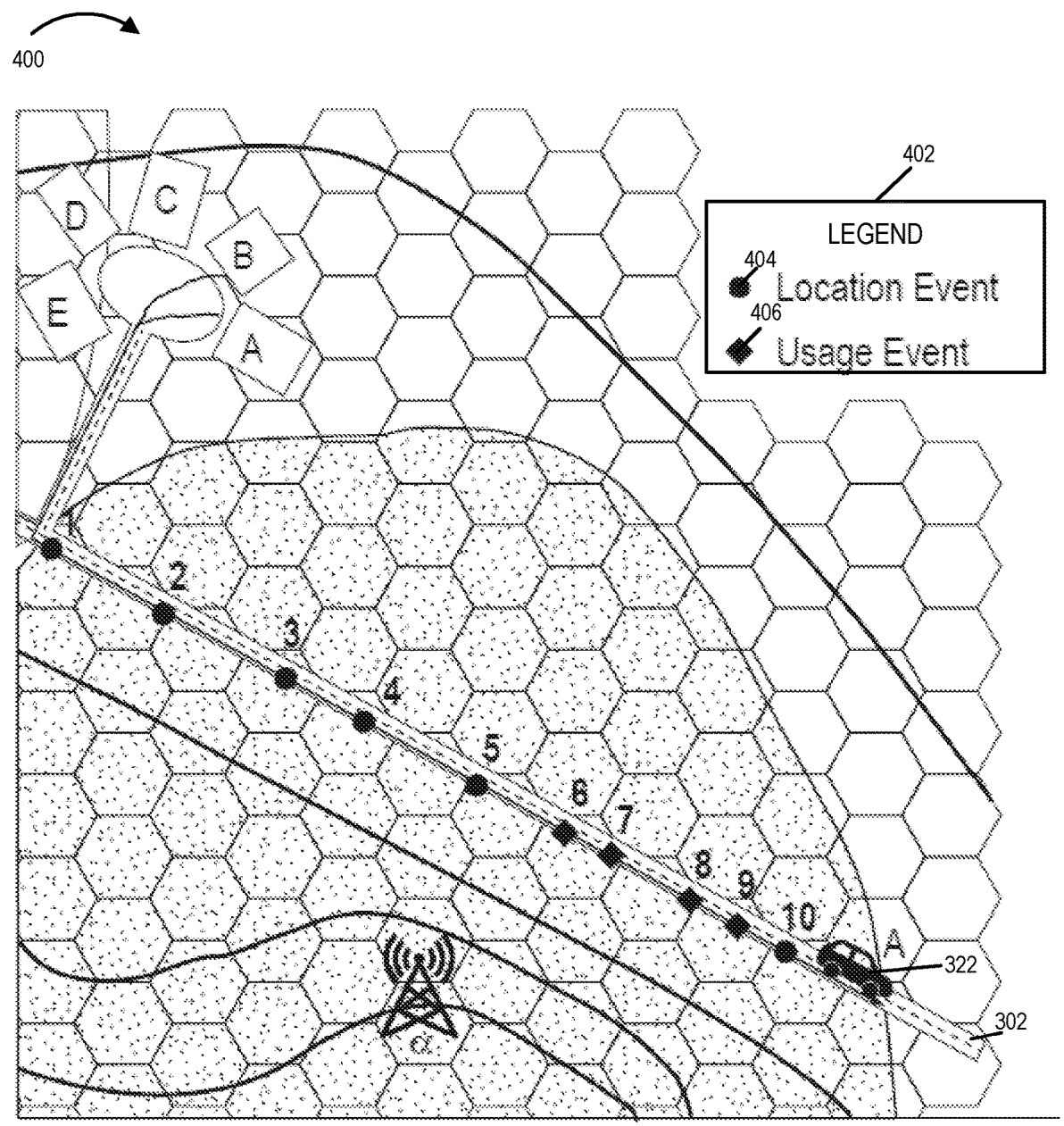
FIG. 4 is a drawing which illustrates usage and location events for customer A with cellular device A, as represented by car symbol A.

Normalization and location assignment will now be described. Initially, consider customer A. While driving to work one day customer A might create a series of CM usage and location events as seen in FIG. 4. FIG. 4 is a drawing 400 which illustrates usage and location events for customer A with cellular device A, as represented by car symbol A 322. Legend 402 illustrates that a black dot 404 represents a location event and a black diamond 406 represents a usage event. FIG. 4 depicts where in A's route the events were generated, but the usage events do not contain any location information. Customer B will generate an analogous event stream, but along the road 302 in the North Western direction.

Figure 5:
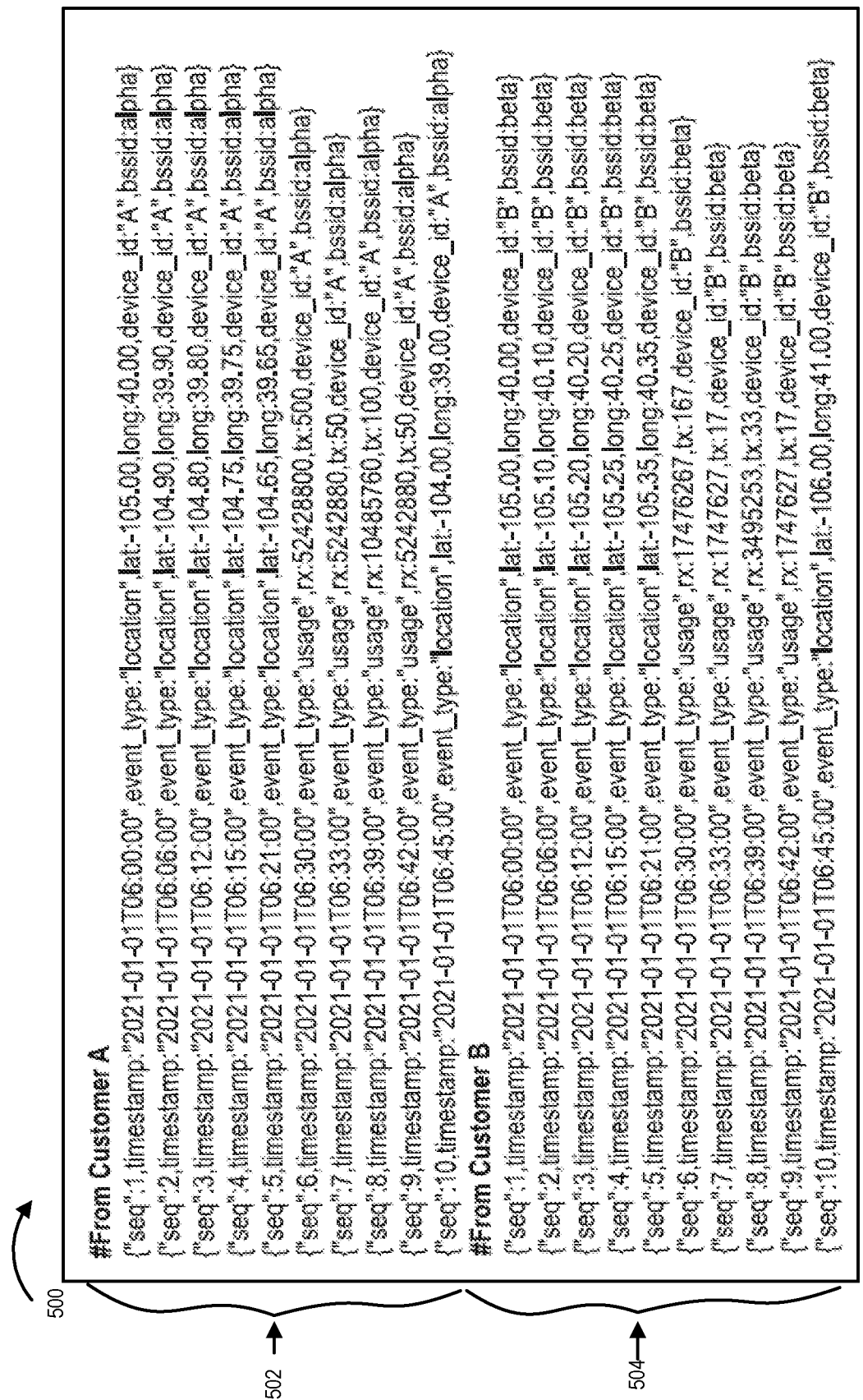
FIG. 5 illustrates an exemplary connection manager (CM) event stream including a CM event stream generated from customer A with cellular device A traveling as depicted in FIG. 4 and a CM event stream generated from customer B with cellular device B also traveling along the same road.

FIG. 5 illustrates an exemplary connection manager (CM) event stream 500 including a CM event stream 502 generated from customer A with cellular device A traveling as depicted in FIG. 4 and a CM event stream 504 from customer B with cellular device B also traveling along road 302 as described above. Each record includes a sequence number, a timestamp, an event type indicating usage event or location event, a device ID, a BSSID. The location event records further include latitude and longitude information, while the event type records further include RX and TX usage information. Note that for this example, the event structure and field names have been simplified. Also, note that although cellular devices A and B are actually consuming the same amount of data, their CM events show different data usage. In the usage events, rx is the amount of data downloaded and tx is the amount of data uploaded. The total usage is the sum of these two field.

Figure 6:
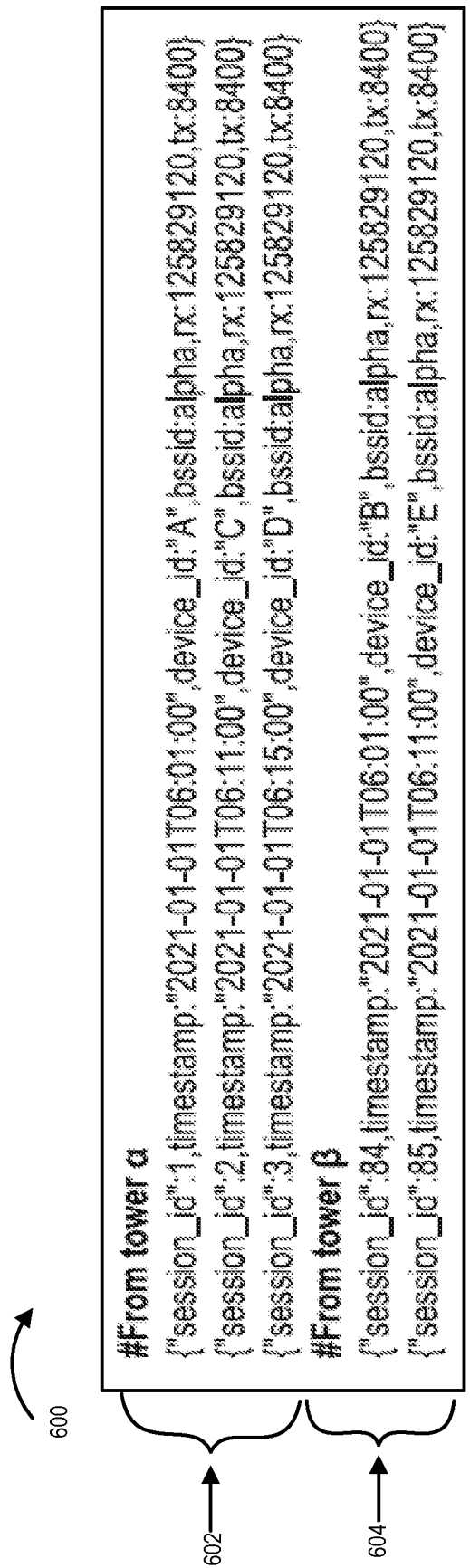
FIG. 6 illustrates exemplary second service provider network, e.g., MNO, usage records, e.g., PRR records, including usage records from tower α and usage records from tower β.

FIG. 6 illustrates exemplary second service provider network, e.g. MNO, usage records, e.g., PRR records, 600 including usage records 602 from tower α 304 and usage records 604 from tower β 308. Each record includes a session id, a timestamp, a device identifier, a BSSID, receive usage information, and transmit usage information. Note that in FIG. 5, CM event records 500 from the first service provider network reports there are only event records from customers A and B (which correspond to android devices with an installed CM application); however, there are no CM events from customers C, D and E (which correspond to iOS devices without the CM application). However, in the second service provider (MNO) usage report records 600 of FIG. 6, usage is reported for each of the customers A, B, C, D and E.

Figure 20:
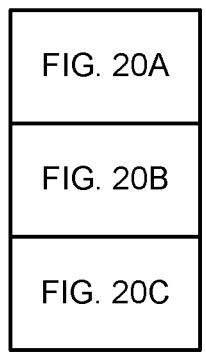
FIG. 20 comprises the combination of FIG. 20A, FIG. 20B and FIG. 20C.

The following description is relevant to step 204 of FIG. 2, and steps 2048, 2050, 2052, 2054, 2056, 2058 of FIG. 20.

The first step in normalization is to adjust the usage reported in the CM events such that the usage from different devices are correctly scaled relative to each other. This will allow us to use this information to build a usage density distribution, basically a two-dimensional representation of the relative amount of data used in each location.

Figure 7:
FIG. 7 illustrates exemplary summed total usage for two CM devices, device A and device B, based on reported CM usage events for a day.

To normalize the data the usage, e.g., all the data usage, reported in connection manager are summed for each device for each day. See drawing 700 of FIG. 7 which illustrates the sum of usage in the CM events for device A and device B, which is 73401020 and 24467008, respectively. Similarly, the usage from each device on each day is calculated from the second service provider network usage reports. In our example, each device has only a single session, but this sum could easily be done, and sometimes is done, across multiple sessions.

The result is two tables, one with the usage in CM per device per day, and the other is the usage in the second service provider usage reports per device per day. These tables are then are inner joined on device and day and the ratio of second service provider (MNO) reported usage to the CM reported usage is calculated. This quantity is hereafter referred to as the normalization factor.

Note, owing to the inner join, only devices that show up on both CM reports and the second service provider usage reports will have a normalization factor. Also, since the devices in CM reports are a subset of the devices in the second service provider (MNO) reports (those running the Android operating system), the normalization factor is effectively only calculated for CM devices.

$$RF_{d,T} = \frac{\sum_{\forall i} U_{d,T,i}^{PRR}}{\sum_{\forall j} U_{d,T,j}^{CM}}$$

The above equation may be referred to as Equation 1 and is a definition of the normalization factor (RF) for device d and day T.

In Equation 1 the sums in the numerator and denominator are over all records in the second service provider usage reports (referred to as PRR) and usage events in CM reports for device d and day T respectively, and:

$U_{d,T,i}^{PRR}$—the usage in the ith record in the second service provider usage reports (PRRs) for device d and day T $U_{d,T,j}^{CM}$—the usage in the jth usage event in the CM records for device d and day T $$RF_{A,2021.01.01} = \frac{125,829,120 \text{ bytes}}{73,401,020 \text{ bytes}} = 1.714$$

$$RF_{B,2021.01.01} = \frac{125,829,120 \text{ bytes}}{24,467,008 \text{ bytes}} = 5.143$$

The above shows an example calculation for the Normalization Factor's for Device A and B for the exemplary date (day) 2021 Jan. 1. The following description is relevant to step 206 of FIG. 2, and steps 2060, 2062, 2064, 2066 of FIG. 20.

Now with the Normalization Factor, we join back to the connection manager events at the device-day level, and rescale the usage by the normalization factor, see table 800 of FIG. 8. In table 800 of FIG. 8, the first column 802 includes a CM event sequence number, the second column 804 includes device identifier, the third column 806 includes event type (location or usage), the fourth column 808 indicates BSSID, the fifth column 810 includes latitude (if location event), the sixth column 812 includes longitude (if location event), the seventh column 814 includes total usage (if usage event), the eight column 816 includes normalization factor (referred to as RF_Factor), the ninth column 818 includes adjusted usage after applying the normalization factor.

This adjusted usage should now be correct in an absolute sense, but more importantly, relative amounts will now also be correct. That is, if the CM data indicates device A used twice as much data as device B, then device A actually used twice as much data as device B.

The following description is relevant to step 208 of FIG. 2, and steps 2070, 2072, 2074, 2076 of FIG. 20.

Once the CM event data has been normalized, the next step is to assign locations to the usage data. As mentioned previously, many CM events contain location information, but this information is not present on the usage events. Furthermore, even if it was on the usage events, it wouldn't be that useful as the usage is accumulated over finite period of time (and a continuous set of locations), and the location reported by the usage event would contain only the location of the device when the event was sent.

Figure 9:
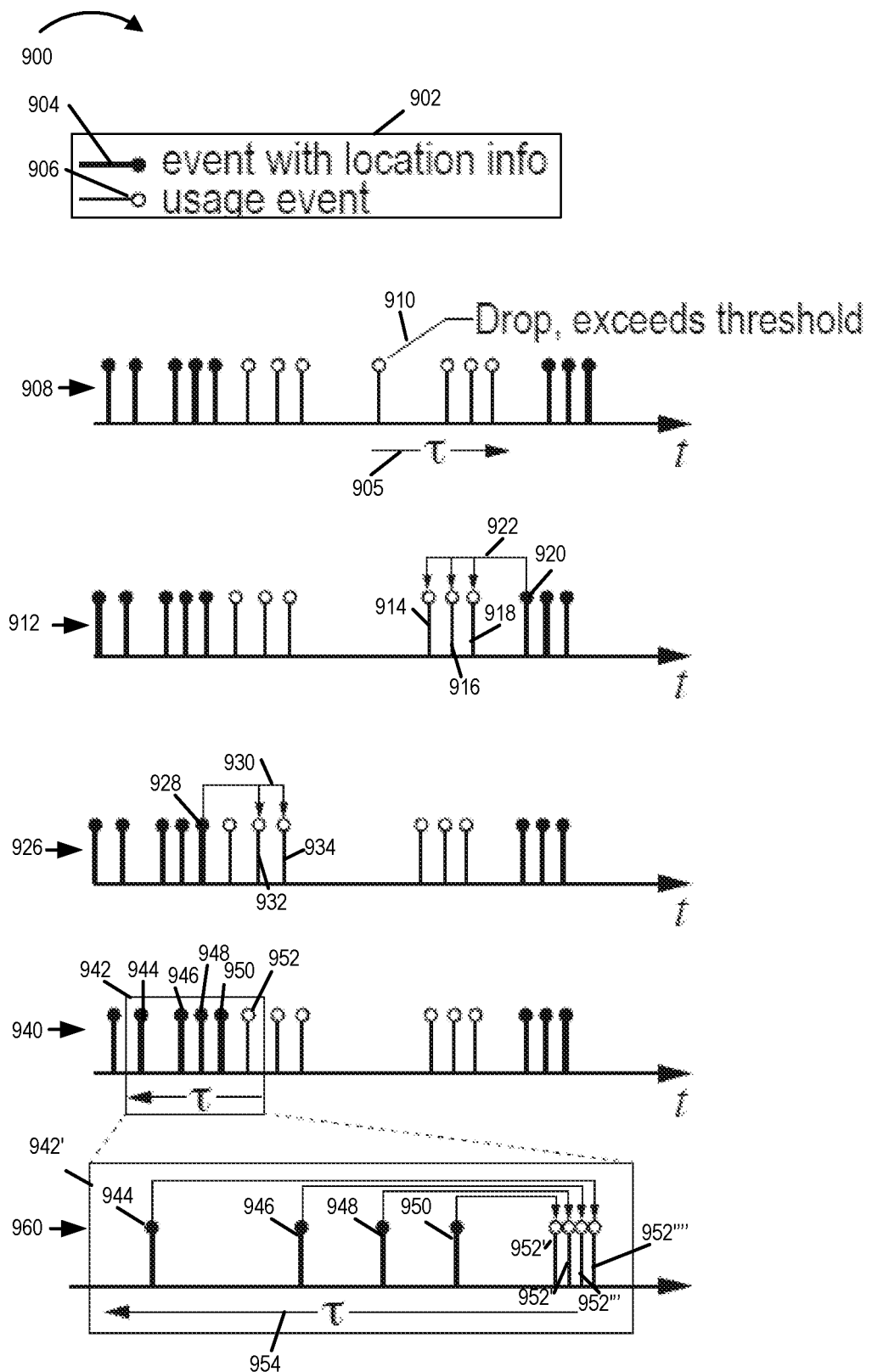
FIG. 9 is a drawing used to illustrate the exemplary location assignment method for assigning location to CM usage events, in accordance with an exemplary embodiment.

To address this issue, a method was developed and implemented to assign locations to the usage events, as described below. FIG. 9 is a drawing 900 used to illustrate the exemplary location assignment method for assigning location to CM usage events. Legend 902 illustrates that a bold line with a small filled in circle, symbol 904, is used to represent events with location information, while line with a small open circle, symbol 906, is used to represent a usage event. Four rules in the exemplary location assignment method are listed below.

Rule 1—Rule 1—CM event sequence 908 illustrates that usage events that are not within some threshold time, τ, of a location event, such as exemplary location event 910 are dropped (this is because we effectively don't know where this usage occurred)

In one embodiment, τ=60 minutes

Rule 2—CM event sequence 912 illustrates that usage events that are closest in time to location event occurring after them, receive the spatial coordinates of that location event. For example, usage events 914, 916, 918, receive the spatial coordinates of location event 920, as indicated by line with arrowheads 922. W know that each of the usage events (914, 916, 918) must have proceeded the location event.

Rule 3—CM event sequence 926 illustrates that usage events that are closest in time to a location event that occurred before them, and have at least one usage event between themselves and a location event, receive the spatial coordinates of the closest location event. For example, usage events 932, 934 receive the spatial coordinates of location event 928, as indicated by line with arrowheads 930.

Each of the usage events (932, 934) must have occurred after the last location event (928).

Rule 4—CM event sequence 940 illustrates a usage event 952 which is proceeded immediately by one or more location events (950, 948, 946, 944)

In this case the usage may have occurred at any or all of the preceding locations.

The objective is to spread the usage over all of these locations.

Drawing 960 shows an expanded version 942' of time window 942. The usage event 952 is converted into N replicas (952', 952", 952'", 952"")_of the original event 952, where N is the number of location events within τ 954 of usage event.

The usage reported by each replica (952', 952", 952'", 952""_is 1/N of the original usage event (952).

Each replica (952', 952", 952'", 95"") retains its original timestamp. Each replica (952', 952", 952'", 952"") is assigned the spatial coordinates of one of the N preceding location events (950, 948, 946, 944).

Note: In step 1 we drop usage events that are farther in time than 60 minutes from a location event. This may seem like we are throwing away information, but in fact we are not. The usage events at this step represent relative usage. That is the relative fraction of the total usage that occurred in one location rather than another. By removing it at this stage, we are essentially saying that we don't know where it occurred, and reallocating it to all the other locations where usage occurred, in proportion to the amount of usage that occurred there.

Figure 10:
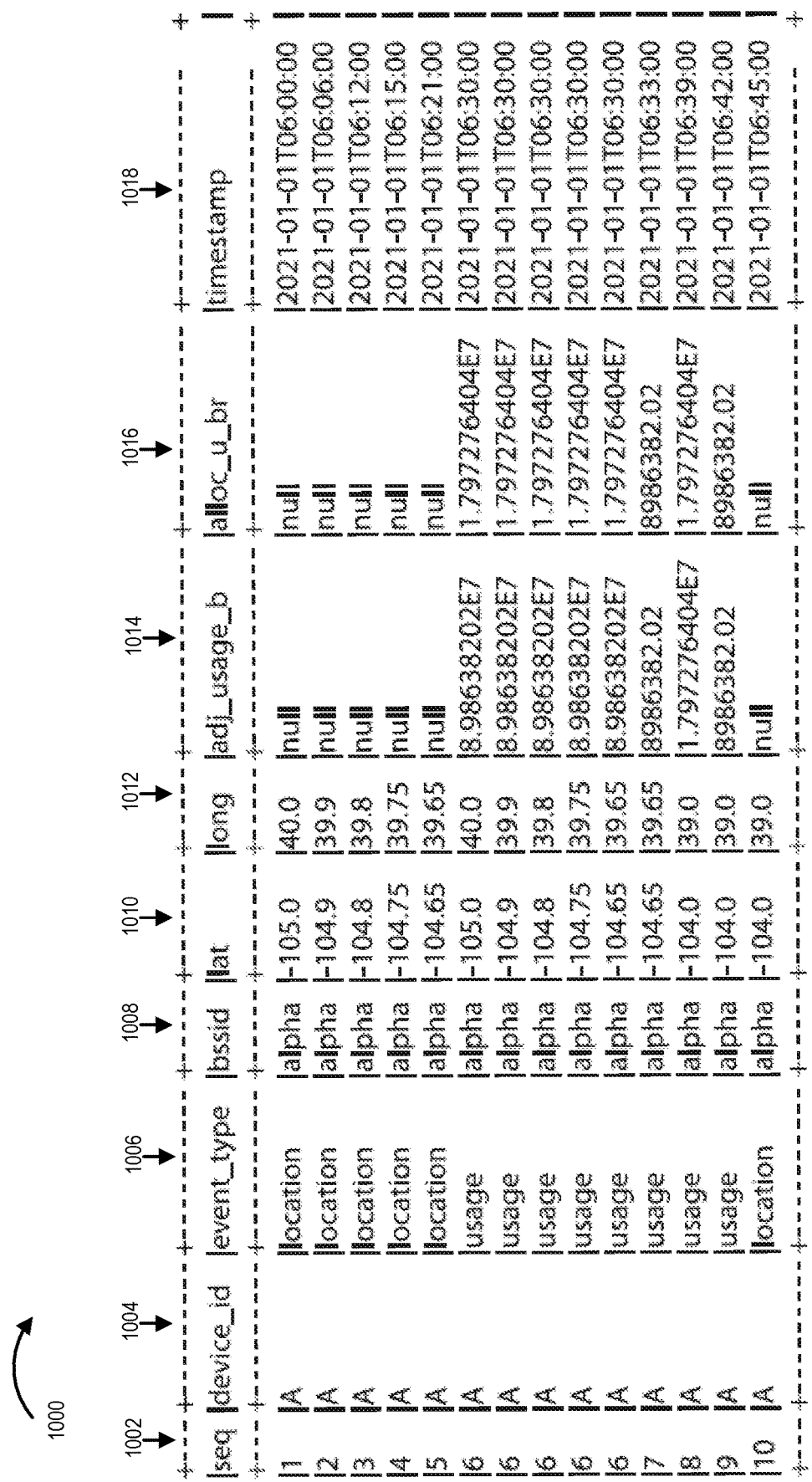
FIG. 10 is a table illustrating events for device A after the location assignment.

FIG. 10 is a table 1000 illustrating events for device A after the location assignment. First column 1002 indicates CM event sequence number; second column 1004 indicates device ID; third column 1006 indicates BSSID; fourth column 1008 indicates latitude, fifth column 1010 indicates longitude; sixth column 1012 indicated adjusted usage; seventh column 1014 indicates allocated usage; and eighth column 1016 indicates a timestamp. The usage assigned to each event is recorded in seventh column 1014, labeled alloc_u_b. Although the location events (1-5 and 10) are included here for context they are dropped from the analysis from this point forward.

The following transformations were made according to the location assignment method.

1) Per rule 4, usage event 6 was divided into 5 events, and its usage spread evenly over the locations from location events 1-5.
2) Per rule 3, usage event 7 was assigned the location from location event 5 as it was the closet to it in time.
3) Per rule 2, usage event 8 and usage event 9 were assigned the location from location event 10 as it was the closet to both of them in time.

Applying this described location assignment method to the usage events from device A, we arrive at the table shown in FIG. 10.

Usage filtering, binning, aggregation, and averaging will now be described.

The next step in the process is to filter the usage to eliminate measurements that could not be captured by a CBRS radio, then aggregate the usage events into spatial bins to form daily distributions of usage, and then time average these distributions to get the final usage density distribution for the model.

The following description is relevant to step 210 of FIG. 2, and step 2078 of FIG. 20.

Filtering will now be described. Because it is difficult for the signal from CBRS radios to penetrate the walls of buildings, in some embodiments, e.g., an embodiment in which CBRS network device (e.g., CBSD base station) placement locations are to be determined, it is desirable to eliminate any usage that occurred indoors from our model. To accomplish this, in some embodiments, a data to geospatial mapping tool such as, e.g. the ESRI Big Data Tool (BDT) is used.

BDT has a batch function that given a point on the surface of the planet (latitude, longitude), and a polygon, will return a Boolean value indicating whether the point is inside the polygon. The polygon in this case would be the footprint of a building and, being inside the footprint, would indicate that the usage occurred inside the building. Building footprint data can be, and sometimes is, obtained from numerous proprietary and open-source providers. In some but not necessarily all embodiments the BDT returns an identifier of the polygon the point is in. If the point is not inside a polygon, then BDT returns null. Since we are not concerned with the particular building the point is in, we convert this to a Boolean value to indicate whether the data usage is inside or outside a building.

For our example above, no activity occurs in the buildings A-D (312, 314, 316, 318), and no usage is eliminated.

Spatial Aggregation will now be described. Spatial aggregation serves two purposes in this process. First, it sets the spatial scale for our analysis, i.e., features smaller than the aggregation bin size will be ignored. Second, it spatially smooths the signal. Our usage measurements are all point locations, and without some form of spatial smoothing the usage density estimates will be zero almost everywhere.

The following description is relevant to step 212 of FIG. 2, and step 2080 of FIG. 20. The BDT library mentioned above has a batch function that, given a latitude-longitude pair, will return an identifier for a hexagonal polygon that the point lies within. These polygons, referred to as spatial bins, tile the surface of the earth.

Figure 11:
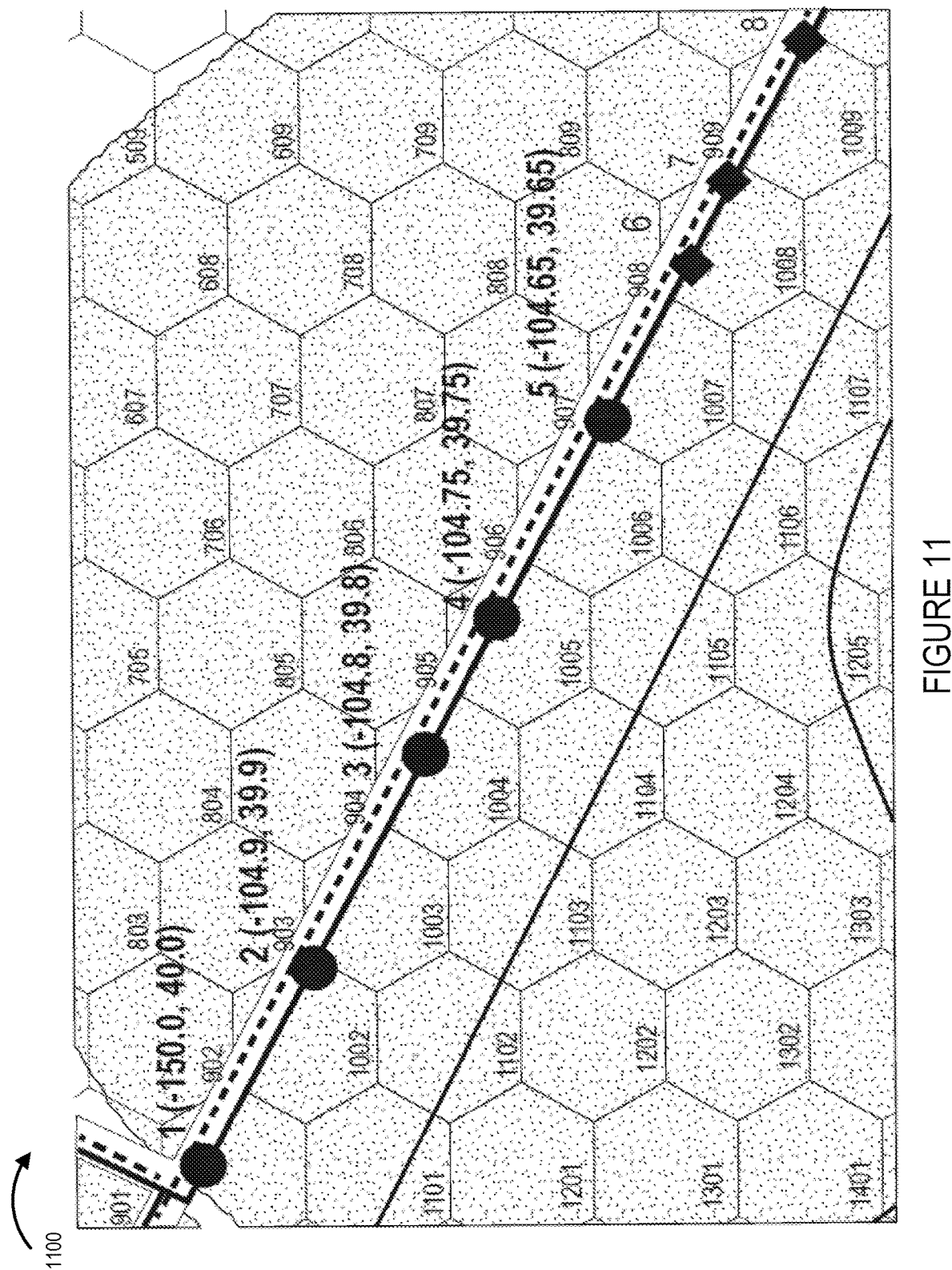
FIG. 11 shows drawing which is an illustrative example of numbered geospatial hexagon bins in our example and further illustrates latitude/longitude coordinates corresponding to location events 1-5, and further illustrates usage events 6-8.
Figure 12:
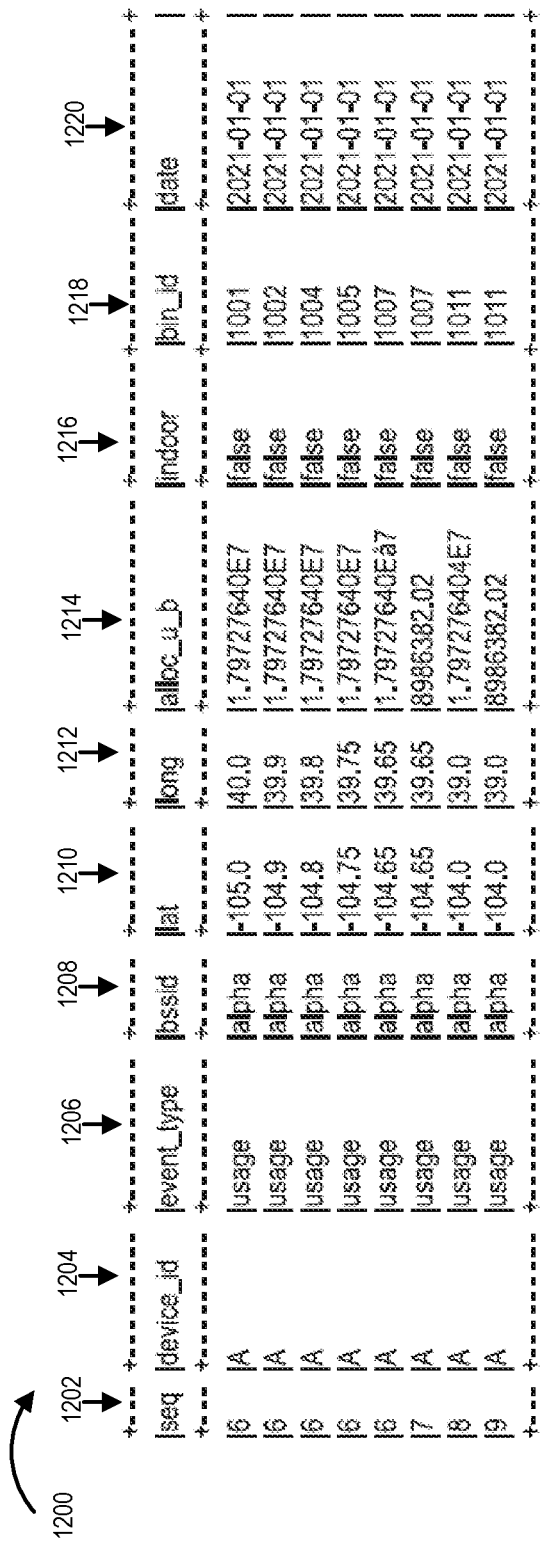
FIG. 12 is a table illustrating an example of CM usage event data post indoor/outdoor filtering and spatial binning in accordance with an exemplary embodiment.

FIG. 11 shows drawing 1100 which is an illustrative example of numbered geospatial hexagon bins in our example geospatially and illustrates latitude/longitude coordinates corresponding to location events 1-5, and further illustrates usage events 6-8. FIG. 11 is a blown up view of a portion of FIG. 4 and further includes geospatial bin numbering as well as lat/lon coordinates specified for the location events 1-5. FIG. 12 is a table 1200 which illustrates how the geospatial mapping and bins translates into analysis of device A.

FIG. 12 is a table 1200 illustrating an example of CM usage event data post indoor/outdoor filtering and spatial binning. First column 1202 includes event sequence numbers; second column 1204 includes device ID; third column 1206 includes event type, which indicates usage events; fourth column 1208 indicates BSSID, fifth column 1210 indicates the latitude assigned to the usage event; sixth column 1212 indicates the longitude assigned to the usage event; seventh column 1214 indicated the allocated usage; eight column 1216 indicates if the event is indoors (false indicates that the event is not indoors but is outdoors); ninth column 1218 indicates a bin_id for an event (the bin id is a ID number assigned to the hexagon geospatial area into which the latitude/longitude coordinates corresponding to the usage event are mapped into); and tenth column 1200 includes a date for the event.

The eighth column 1216 labeled indoor, includes Boolean values, each Boolean value indicating whether a point (based on lat/lon coordinates) is within the footprint of a building or not, and the ninth column 1218 labeled bin_id includes a value which identifies the spatial bin the point lies in.

The following description is relevant to step 214, 216 and 218 of FIG. 2. This data is this converted into a daily spatial usage density distribution by summing all the usage with the same bin_id, and dividing these totals by the sum of all usage as reflected in the normalized CM events. Each row of the resulting table reflects the fraction of the daily usage that fell into a spatial bin, see FIG. 13.

Figure 13:
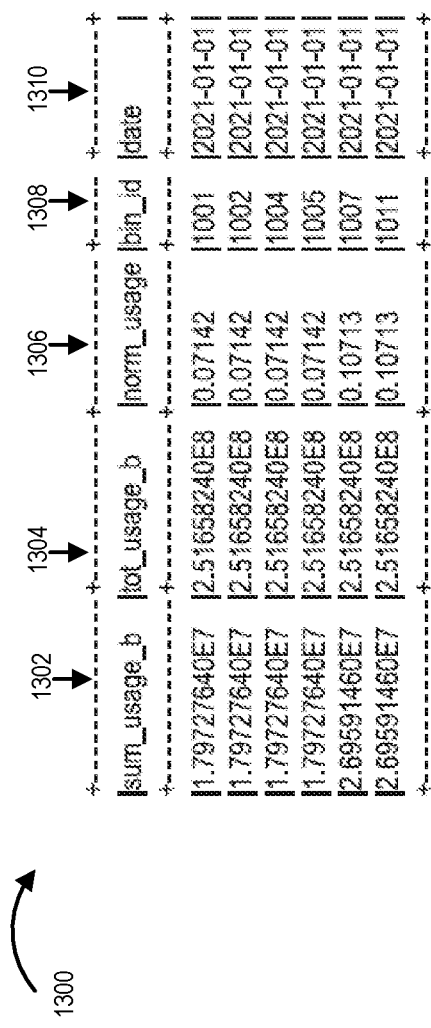
FIG. 13 is a table illustrating data usage, post spatial averaging and normalization.

FIG. 13 is a table 1300 illustrating data usage post spatial averaging and normalization. First column 1302 is the sum_usage_b column; second column 1304 is the tot_usage_b column; third column 1306 is the norm usage column; fourth column 1308 is the bin_id column; and fifth column 1310 is the date column. First column 1302 labeled sum_usage_b, is the sum of all usage in the bin indicated in the bin_id column. Tot-usage_b is the total normalized daily usage of CM events and is thus constant for each of the rows of the table. Norm usage is sum_usage_b/tot_usage_b and represents the fraction of all usage that occurred in bin_id.

The following description is relevant to step 220 of FIG. 2. Time Averaging will now be described.

Figure 14:
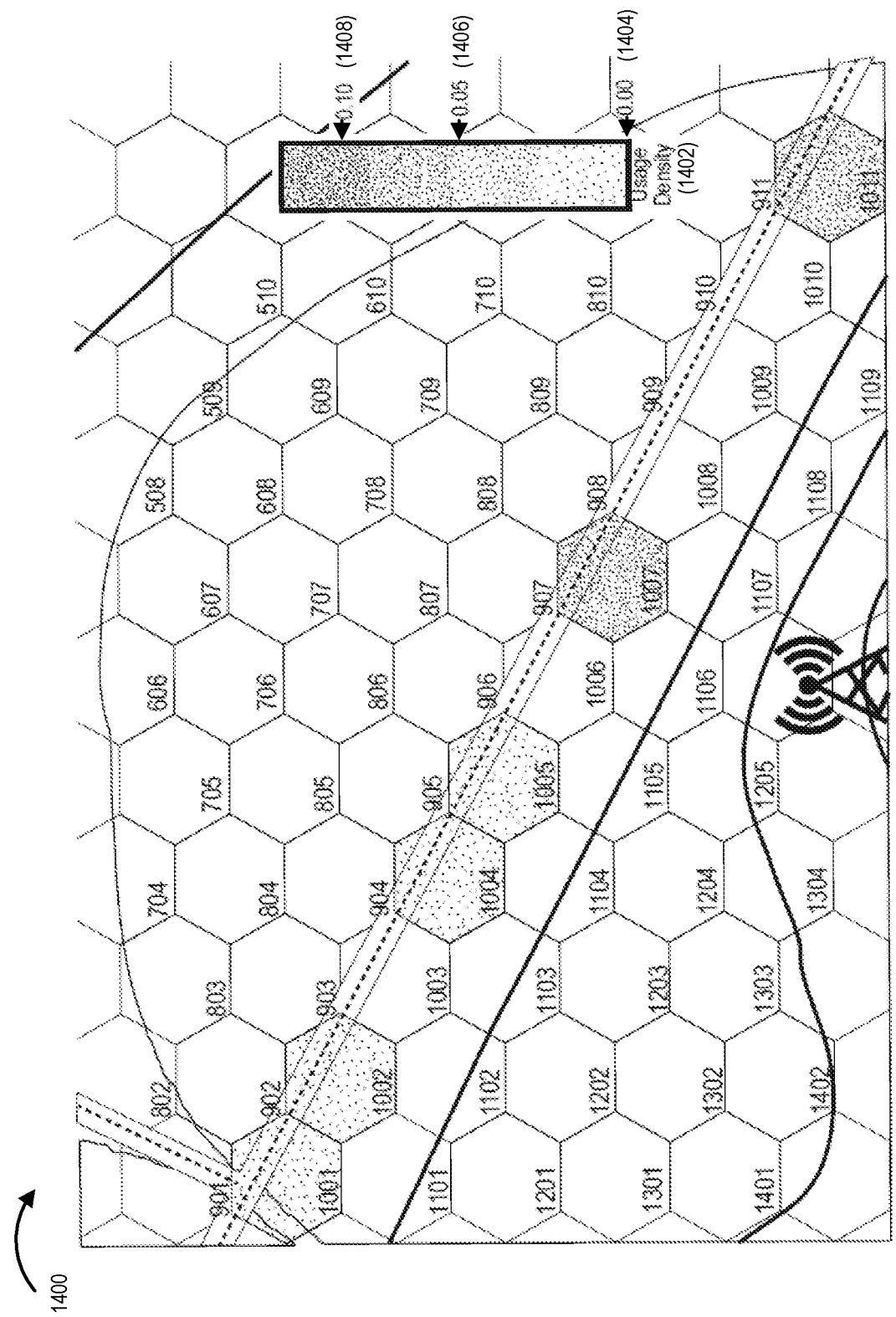
FIG. 14 includes drawing which shows a depiction of the daily usage density derived from the rationalized CM events on 2021 Jan. 1.

FIG. 14 includes drawing 1400 which shows a depiction of the daily usage density derived from the rationalized CM events on 2021 Jan. 1. Usage density legend 1402 indicates that as the dot density increases, the usage density increases. No dots 1402 indicates a usage density value of 0.00; dot density level 1406 indicates a usage density of 0.05; and dot density level 1408 indicates a usage density value of 0.10. As can be seen, the usage has been allocated to our location measurements, but still retains artifacts of the collection process. That is, usage is aggregated during collection and locations are reported at a limited number of discrete points.

To address this we leverage the fact that the usage and location events are effectively sent at random times. What this means is that we can treat the daily distribution as a random set of samples from some underlying distribution. The more samples we collect, i.e., the longer we collect data, the better knowledge we have of the underlying distribution. The standard way of dealing with this problem in signal analysis is with ensemble averaging.

Figures 15, 16:
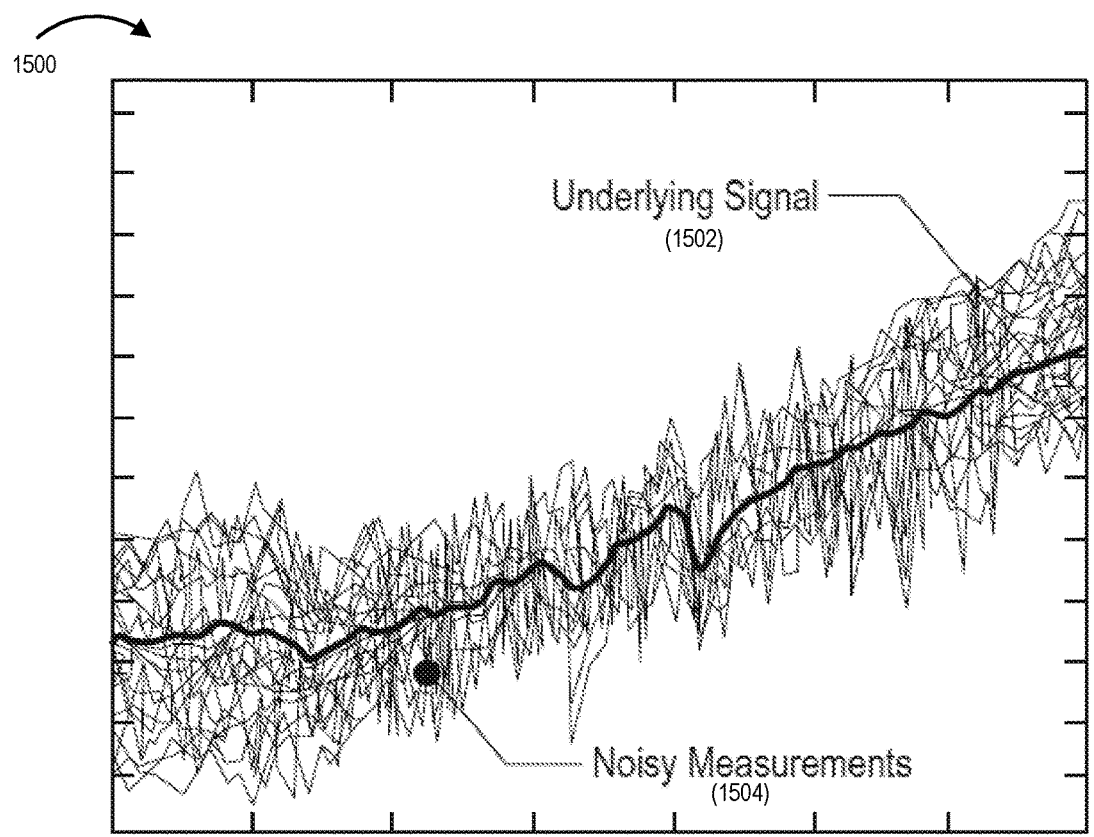
FIG. 15 is a drawing which illustrates how ensemble averaging is capable of recovering an underlying signal from a series of noisy measurements.
FIG. 16 is a drawing of example table which shows indoor/outdoor usage fractions per day.

FIG. 15 is a drawing 1500 which illustrates how ensemble averaging is capable of recovering an underlying signal 1502 from a series of noisy measurements 1504.

A complication to this is that we are attempting to make this estimate at a time when user population is growing very dramatically. As a result, if we simply weight all the data evenly, our distribution will reflect only the very end of the collection period, which may be subject seasonal or exogenous fluctuations (e.g., there is significantly more outdoor activity during warm periods than cool ones). On the other hand, as the number of users grows, so does the number of samples, which should also provide a better a measure of the underlying distribution.

In an attempt to strike a balance between these two concerns, in some embodiments the exemplary method include time averaging the daily density distributions and weighting each day by the number of CM events collected for that day. Thus, noisy daily distributions are, in some embodiments, combined into the final distribution. Usage scaling and projection will now be described. The filtering, aggregation and averaging step has left us with a usage density distribution. That is, we know, given that usage occurs, where it is likely to occur and in what proportions. To estimate the value of the spectrum, we will need to know absolute amount of usage that is likely to occur in each location.

To get this, we return to the second service provider data usage records, e.g., the PRRs, that contain the total usage across each the first service providers client devices (e.g., android UE devices with CM, and iOS UE devices without CM), regardless of whether they are running the Connection Manager application or not. We will use this to form a projection of what we expect the total usage to be on any particular day (sometimes referred to as a characteristic total usage for the target date (C), and multiply the usage density distribution, P(X,Y), by this value C to get the total usage distribution, f(X,Y).

Or to put it more precisely:

$$f(x,y)=C \qquad \text{Equation 1}$$

Where
  f(x,y) is the usage distribution (the distribution we want)
  ρ(x,y) is the usage density distribution (the quantity calculated above),
  C Is a scale factor is that converts the density to total valid usage on the day of interest Scaling will now be described. Ultimately, we want to estimate the total valid usage (from each of the first service provider customers) using the second service provider (MNO) usage records (e.g., PRRs). In order to do that though, we need to correct the PRRs for the fact that not all usage captured in the PRRs occurs outdoors (our definition of valid in this situation). Luckily, we can get this from our Normalized CM usage.

Recall that in the filtering and spatial aggregation section, it was described how the rationalized CM usage is labelled as occurring indoors or outdoors, and assigned to a spatial bin (See FIG. 12). Returning to table 1200 of FIG. 12, table 1200 is used to calculate the indoor and outdoor fraction per day by grouping by the indoor value and day, and summing the usage, then dividing by the total regularized usage for that day. FIG. 16 is a drawing of example table 1600 which shows indoor/outdoor fractions per day. First column 1602 includes ref_usage_b information; second column 1604 includes daily totals; third column 1606 shows indoor/outdoor fractions; fourth column 1608 shows indoor flag (false or true); and fifth column 1610 shows date information. Date indicates the day of interest. Indoor flag—is a Boolean value indicating whether the row refers to an indoor or an outdoor fraction (indoor=true signifies indoor fraction, while indoor=false signifies an outdoor fraction). Fraction indicates the fraction of usage for the day of interest. Daily_total indicates the total CM normalized usage for the day. Ref_usage_b is the amount of normalized usage that is either indoor or outdoor according to the indoor flag.

We then return to the second service provider network usage records, e.g., PRRs. The following description is relevant to step 222 of FIG. 2. We group by day and calculate the total usage per day in the PRRs. The following description is relevant to step 224 of FIG. 2. We then join this to the CM indoor/outdoor table by day, and scale the PRR reported total usage down by the outdoor fraction, see table 1700 of FIG. 17.

Figures 17, 18:
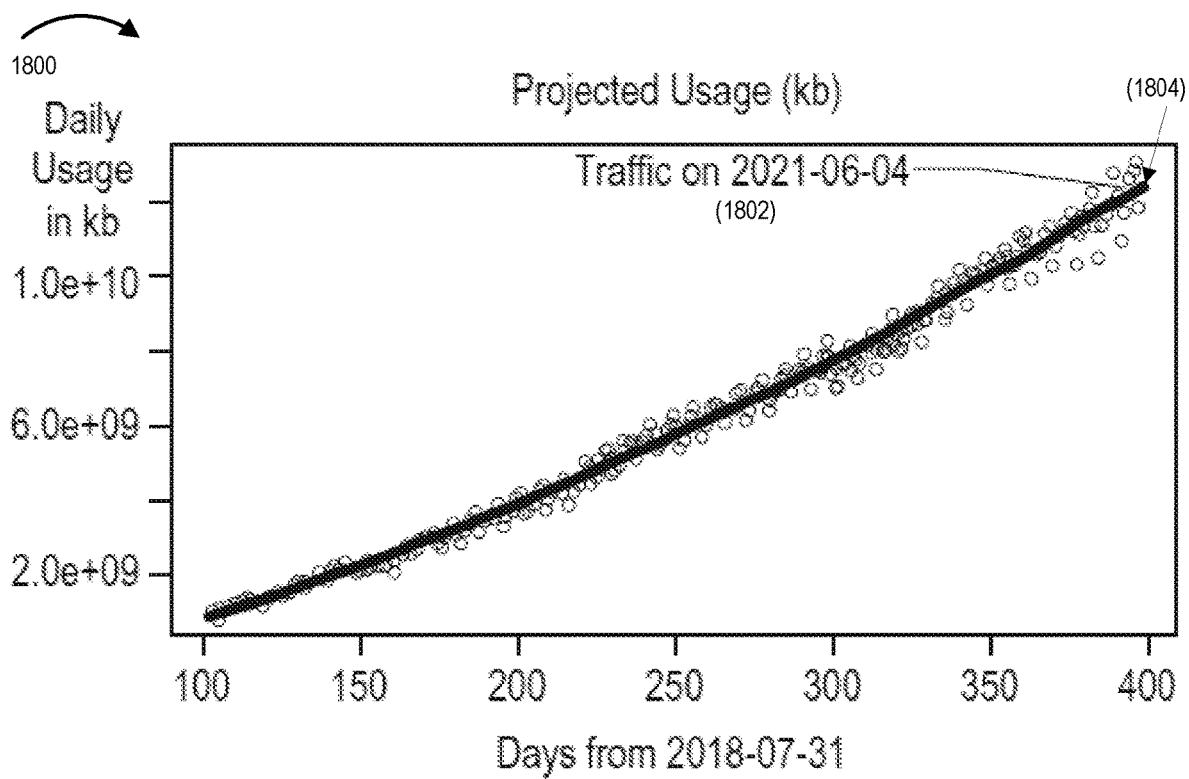
FIG. 17 is an example table of second service provider usage records (e.g., PRR) including outdoor fraction adjusted usage in accordance with an exemplary embodiment.
FIG. 18 is a drawing illustrating an example of determining a regressed usage function, e.g., using a quadradic fit, to be used to determine a characteristic total usage (C) on a target date.

Table 1700 of FIG. 17 is an example of second service provider usage records (e.g., PRR) including outdoor fraction adjusted usage. First column 1702 includes ref_usage_b information; second column 1704 includes prr_tot-usage_b information; third column 1706 includes fraction information; fourth column 1708 includes adj_prr_usage_b information; fifth column 1710 includes indoor flag values; and sixth column 1712 includes date information.

The total usage values in column 1704, which are prr_total usage_b values are adjusted by the outdoor fraction values in third column 1706 to yield estimated outdoor fraction values in fourth column 1708 which are called adj_prr_usage_b values.

Projection will now be described. The following description is relevant to steps 226 and 228 of FIG. 2. The final step in determining the scaling factor C is to project estimated outdoor usage on the day of interest. The reason that we use a projection, rather than just taking the usage from the table in FIG. 17, is that there is a significant day-to-day variation in the usage due to environmental (warm vs cold days), seasonal factors (weekdays vs weekends), and exogenous factors (like sporting events, or political rallies).

Since this value is to be used for estimates of new base station (e.g., CBSD) deployment, we want our value for C to be representative of typical usage on the day of interest, rather than be affected by the outside temperature or day of the week chosen. For this reason, we perform a quadratic fit to the PRR estimated outdoor usage, and use the value returned by the function on the day of interest.

FIG. 18 is a drawing 1800 illustrating an example of determining a regressed usage function, e.g., using quadradic fit, to be used to determine a characteristic total usage (C) on a target date. The data points, represented by small circles 1802 represent the second service provider usage records (e.g., PRR) estimated outdoor usage values, and the solid line 1804 is the quadric fit to those points.

The following description is relevant to step 230 of FIG. 2. Returning to Equation 2, we get C from the projection in FIG. 18, and P (X,Y) from the time averaging. Multiplying the two, we get the full usage density distribution f(X,Y).

$$f(x,y)=C \qquad \text{Equation 2}$$

Figure 19:
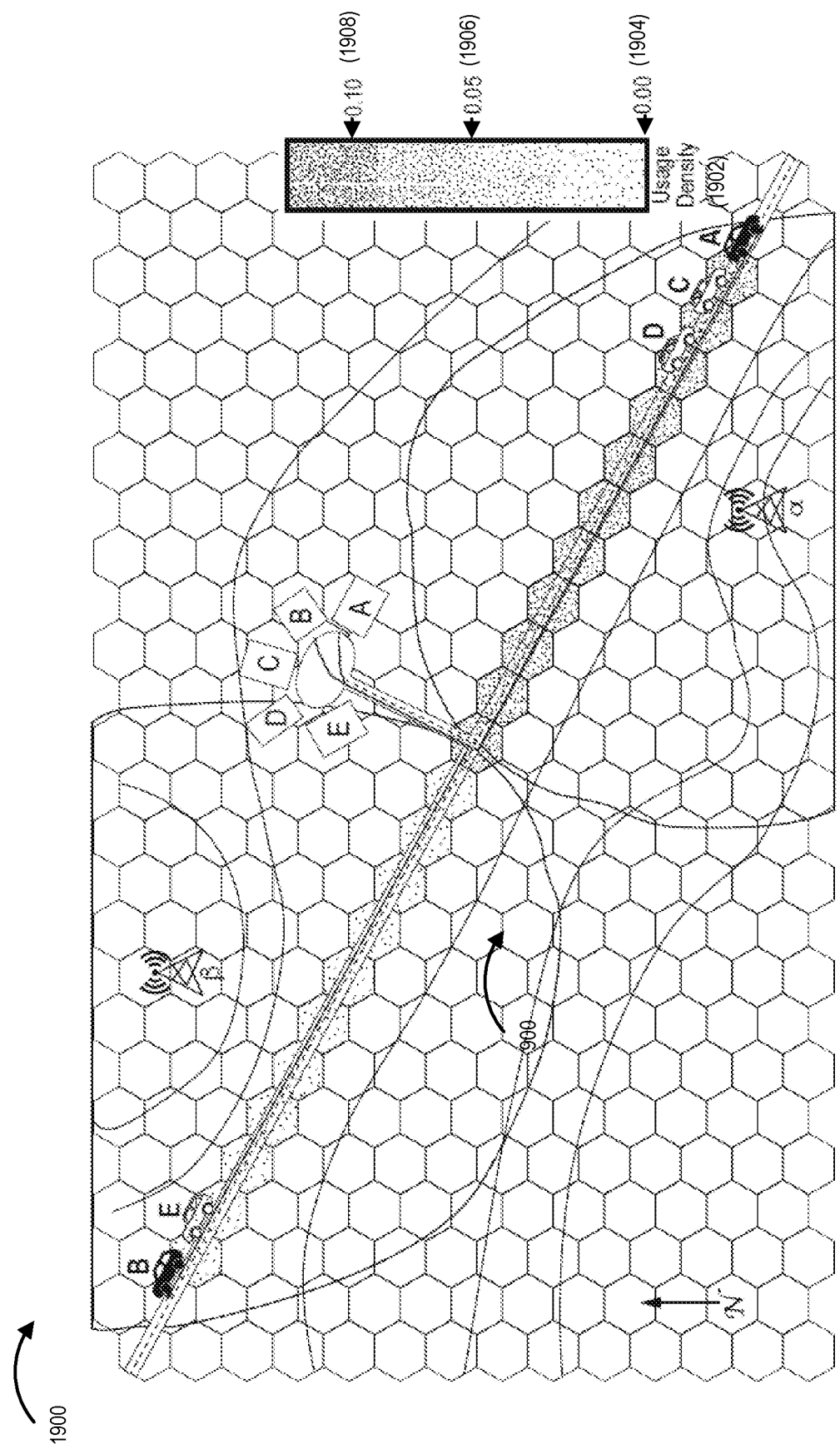
FIG. 19 is a drawing which illustrates actual distribution including both android (CM enabled) and iOS devices (non-CM enabled devices).

Where:
  f(x,y) is the usage distribution (the distribution we want)
  τ(x,y) is the usage density distribution (the quantity calculated above)
  C—is the total valid usage on the day of interest In the example above we made the assumption that the spatial distribution of usage for Android devices (which generate CM events) and iOS devices (which do not generate CM events) was identical. As a result, in our scenario this will result in a uniform distribution of usage along the main road going to the South East and North West. In actuality, owing to usage from the iOS devices C-E, ⅔ths of usage will be along the North West route and ⅓ths will be along the South East route. FIG. 19 is a drawing 1900 which illustrates actual distribution including iOS devices. Usage density legend 1902 indicates that as the dot density increases, the usage density increases. No dots 1402 indicates a usage density value of 0.00; dot density level 1906 indicates a usage density of 0.05; and dot density level 1908 indicates a usage density value of 0.10.

Note, there is no loss in usage, as the density distribution is scaled to the PRRs which are truth in terms of total usage, rather we end up shifting the usage around due to shifts in the relative ratio of iOS to Android usage.

As a result, we end up with an uncertainty in our spatial distributions that is proportional to the spatial fluctuations in the ratio of iOS to Android usage. This ratio can be determined at the tower level, that is, for each tower we can determine the ratio of android to iOS usage, which can be as large as 50% across all the towers in some counties but this is only intended to be exemplary and in no way limiting.

For the application of estimating the value of the CBRS spectrum on a county level, this level of uncertainty was deemed acceptable as it is compounded over 1000 s of cell sites and results in an uncertainty in the total captured usage that is generally less than 5%.

The traffic model as formulated above also has applications for determining the layout of our network in the county. In this application it is desirable to reduce that uncertainty as much as possible.

Figure 20A:
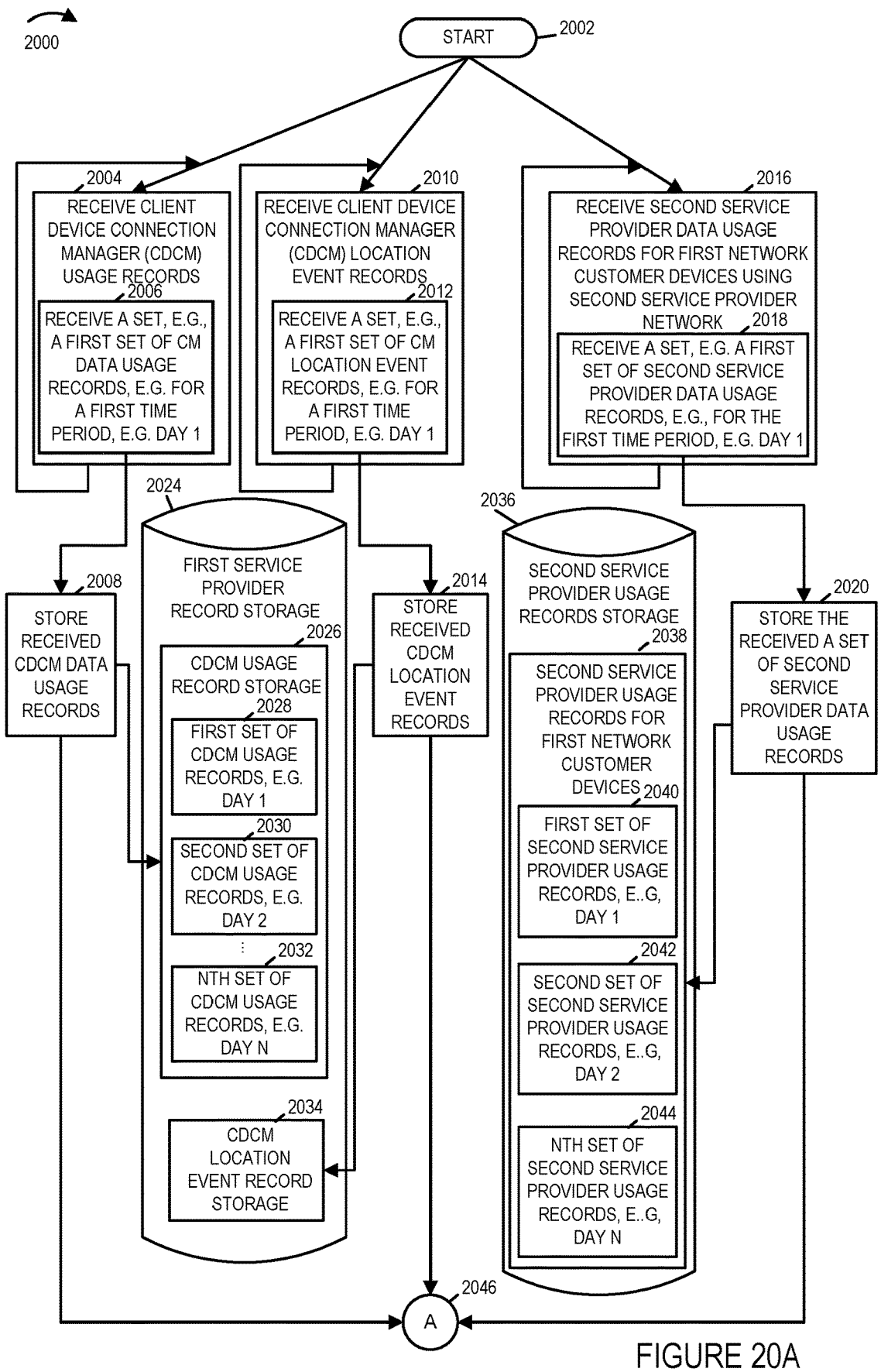
FIG. 20A is a first part of a flowchart of an exemplary method of using wireless data usage information from a variety of sources in accordance with an exemplary embodiment.
Figure 20B:
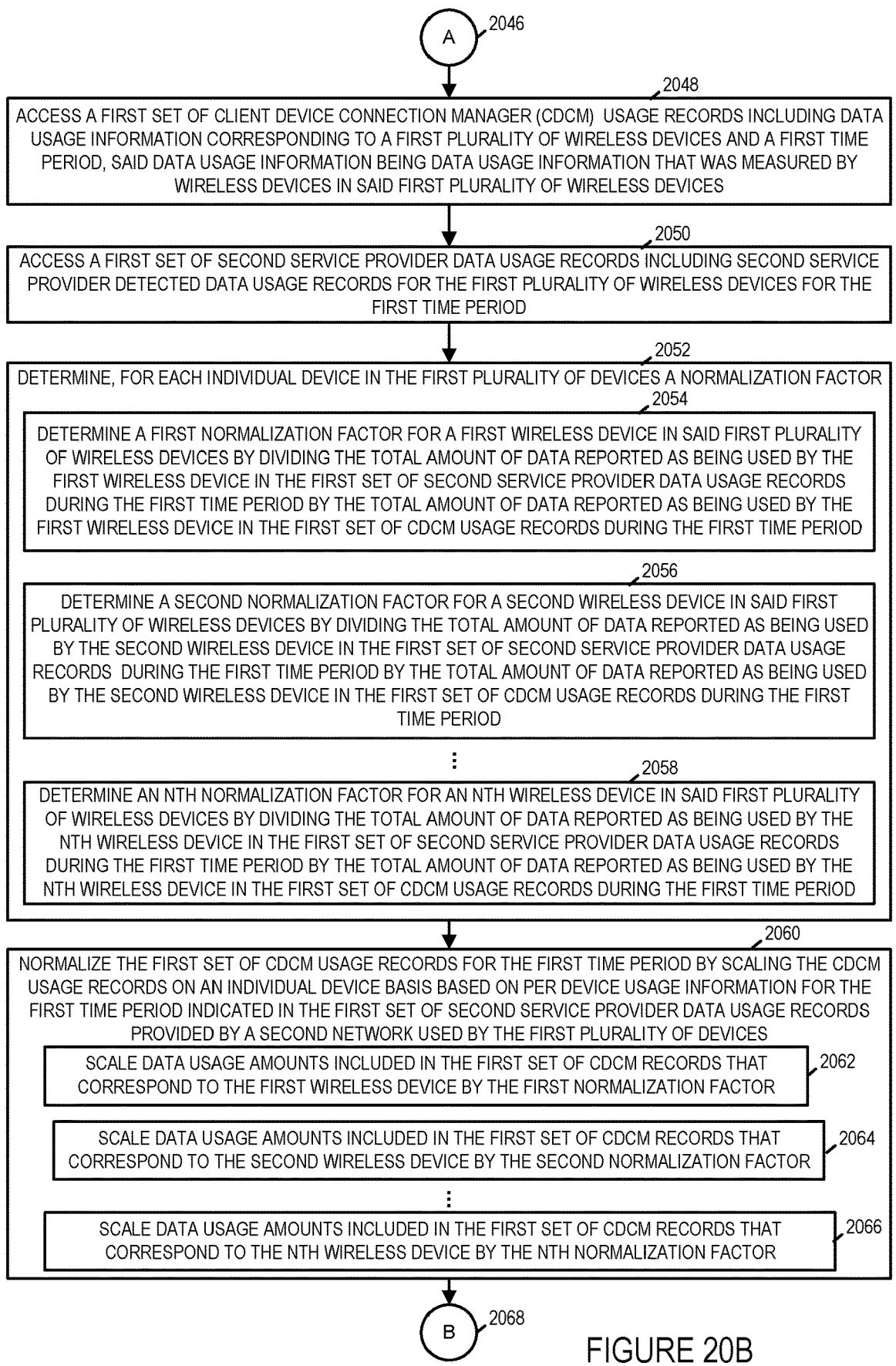
FIG. 20B is a second part of a flowchart of an exemplary method of using wireless data usage information from a variety of sources in accordance with an exemplary embodiment.
Figure 20C:
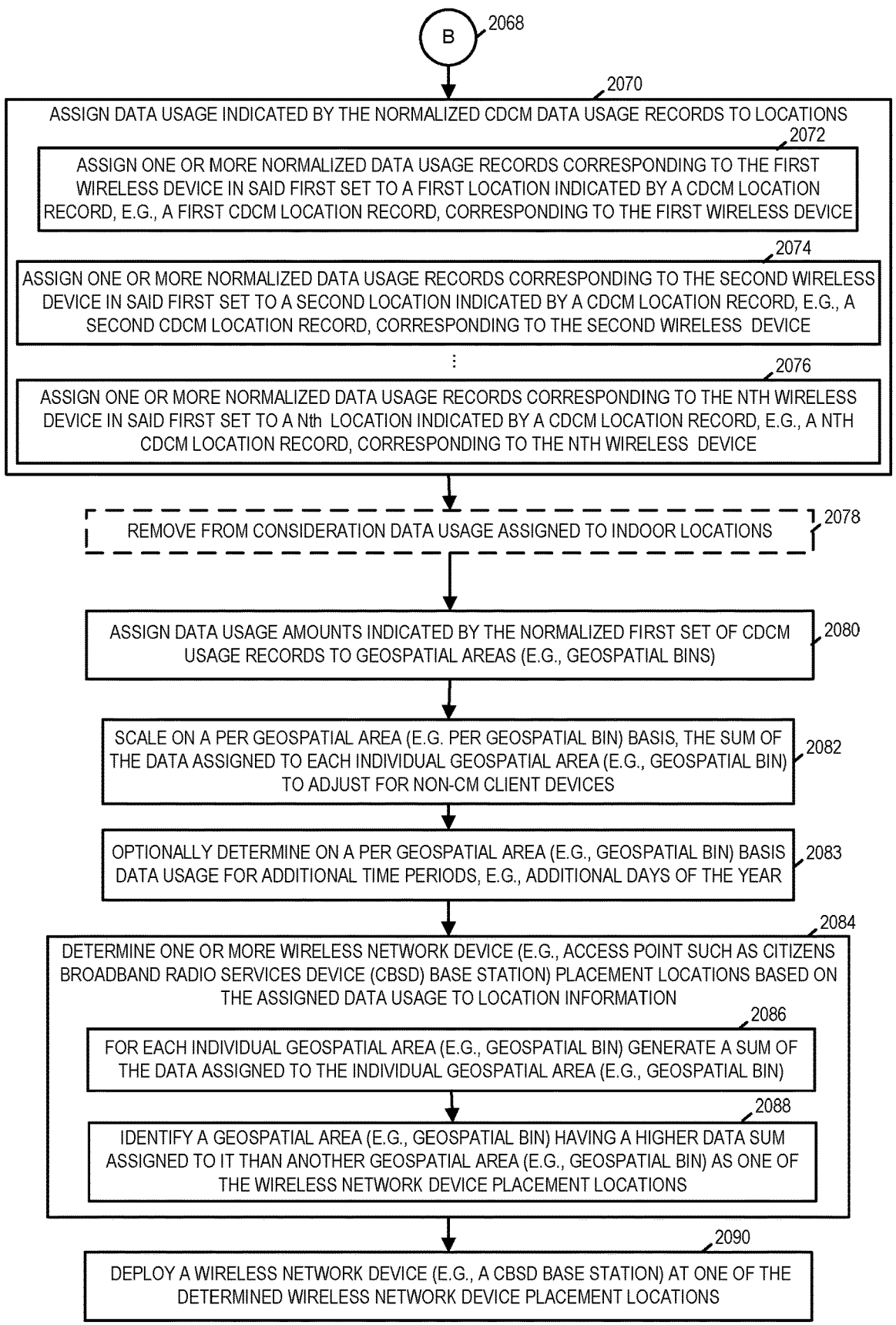
FIG. 20C is a third part of a flowchart of an exemplary method of using wireless data usage information from a variety of sources in accordance with an exemplary embodiment.

FIG. 20, comprising the combination of FIG. 20A, FIG. 20B and FIG. 20C, is a flowchart 2000 of an exemplary method of using wireless data usage information from a variety of sources in accordance with an exemplary embodiment. Steps of the exemplary method of flowchart 2000 of FIG. 20 is, e.g., performed by one or more devices of communication system 100 of FIG. 1. Operation starts in step 2002 in which the communications system 100 is powered on and initialized.

Operation proceeds from start step 2002 to steps 2004, 2010 and 2016. In step 2004 a first service provider network management node, e.g., node 102, receives client device connection manager (CDCM) usage records. Step 2004 includes step 2006 in which the first service provider network management node receives a set, e.g., a first set of CM data usage records, e.g., for a first time period, e.g., day 1. The received CM data usage records, sometimes referred to as CM usage event records, have been sent from first network UE devices including a CM application, e.g., any of UEs (114, 116, 118, 120, 122, 124, 126, . . . , 128). Operation proceeds from step 2006 to step 2008. In step 2008 the first service provider network management node stores the received CDCM usage records in CDCM usage records storage 2026 of 1st service provider records storage 2024.

Steps 2004, 2006 and 2008 are performed multiple times, e.g., with a different set of CDCM usage records being stored for each time period, e.g., one set per day. CDCM usage records storage 2026 includes CDCM usage records corresponding to different time periods (a first set of CDCM usage records 2028 (e.g. for day 1), a second set of CDCM usage records 2030 (e.g. for day 2), . . . , and a Nth set of CDCM usage records 2032 (e.g., for day N)). In one example day N=day 365.

In step 2010 the first service provider network management node, e.g., node 102, receives client device connection manager (CDCM) location event records. Step 2010 includes step 2012 in which the first service provider network management node receives a set, e.g., a first set of CM location event records, e.g., for a first time period, e.g., day 1. The received CM location event records have been sent from first network UE devices including a CM application, e.g., any of UEs (114, 116, 118, 120, 122, 124, 126, . . . , 128). Operation proceeds from step 2012 to step 2014. In step 2008 the first service provider network management node stores the received CDCM location event records in CDCM location event record storage 2034 of 1st service provider records storage 2024.

Steps 2010, 2012 and 2014 are performed multiple times, e.g., with a different set of CDCM usage records being stored for each time period, e.g., one set per day. In some embodiments, steps 2004, 2006, 2008, 2010, 2012, and 2014 are perform by or under the direction of a connection manager (CM) management module, e.g., CM management module 160 of first service provider network management node 102.

In step 2016 a second service provider network management node, e.g. node 104, receives second service provider data usage records for the first network customer devices which are using the second service provider network. Step 2016 includes step 2018 in which the second service provider network management node receives a set, e.g., a first set, of second service provider data usage records for first network customer devices using the second service provider network, e.g., for the first time period, e.g. day 1. The received data usage records have been sent from APs (110, . . . 112) of the second service provider network which are providing service to any of first service provider UEs (114, 116, 118, 120, 122, 124, 126, . . . , 128, 130, 132, 134, 136, 138, . . . , 140), which includes both CM type UEs (e.g., android UEs which include a CM application) and non-CM type UEs (e.g., iOS UEs). Operation proceeds from step 2018 to step 2020. In step 2020 the second service provider network management node stores the received set of second service provider data usage records in second service provider usage records for first network customer devices 2038 of 2nd service provider usage records storage 2036.

Steps 2016, 2018 and 2020 are performed multiple times, e.g., with a different set of data usage records being stored for each time period, e.g. one set per day. Second service provider usage records storage for first network customer devices 2038 includes data usage records corresponding to different time periods (a first set of second service provider usage records 2040 (e.g. for day 1), a second set of second service provider usage records 2042 (e.g. for day 2), . . . , and a Nth set of second service provider usage records 2044 (e.g., for day N)). In one example day N=day 365.

The first, second and Nth set of second service provider data usage records (2040, 2042, . . . , 2044) provided by the second network includes data records corresponding to devices which do not support a connection manager application used to report connection manager client usage data records (e.g., non-CM client devices such as iOS devices) in addition to the first plurality of wireless devices which do provide CMCD usage records (e.g., CM client devices such as Android devices including a CM application).

Following completion of the data collection, e.g., corresponding to a year, operation proceeds from steps 2008, 2014, and 2020, via connecting node A 2046 to step 2048. In step 2048 the first network service provider network management node accesses a first set of client device connection manager (CDCM) usage records (e.g., first set of CDCM usage records 2028) including data usage information corresponding to a first plurality of wireless devices and a first time period (e.g., day 1), said data usage information being data usage information that was measured by wireless devices in said first plurality of wireless devices. In some embodiments, the first plurality of wireless devices are CM enabled devices which execute a connection manager (CM) application and report device usage data upon the occurrence of a CM usage event and which report device location information upon occurrence of a device location event. In some embodiments the first time period is a day. Operation proceeds from step 2048 to step 2050.

In step 2050 the first network service provider network management node accesses a first set of second service provider data usage records (e.g. first set of second service provider usage records 2040) including second service provider detected data usage records for the first plurality of wireless devise for the first time period (e.g., day 1). For example, in step 2050 the first network service provider management node accesses second service provider records indicating data usage detected by the second service provider network on a per device basis during the first time period, e.g., the same day to which the first set of client device CM data usage records corresponds. Operation proceeds from step 2050 to step 2052.

In step 2052 the first network service provider network management node determines, for each individual device in the first plurality of devices a normalization factor. The first service provider network CM based data usage information is considered to be less accurate than the second service provider based usage information; therefore, normalization factors are determined to adjust, e.g., correct, the CM based usage information. Step 2052 includes steps 2054, 2056 and 2058.

In step 2054 the first service provider network management node determines a first normalization factor for a first wireless device in said first plurality of wireless devices by dividing the total amount of data reported as being used by the first wireless device in the first set of second service provider data usage records during the first time period by the total amount of data reported as being used by the first wireless device in the first set of CDCM usage records during the first time period.

In step 2056 the first service provider network management node determines a second normalization factor for a second wireless device in said first plurality of wireless devices by dividing the total amount of data reported as being used by the second wireless device in the first set of second service provider data usage records during the first time period by the total amount of data reported as being used by the second wireless device in the first set of CDCM usage records during the first time period.

In step 2058 the first service provider network management node determines an Nth normalization factor for an Nth wireless device in said first plurality of wireless devices by dividing the total amount of data reported as being used by the Nth wireless device in the first set of second service provider data usage records during the first time period by the total amount of data reported as being used by the Nth wireless device in the first set of CDCM usage records during the first time period. Operation proceeds from step 2052 to step 2060.

In step 2060 the first service provider network management node normalizes the first set of CDCM usage records (e.g., records 2028) for the first time period by scaling the CDCM usage records on an individual device basis based on per device usage information for the first time period indicated in the first set of second service provider data usage records (e.g., records 2040) provided by a second network used by the first plurality of wireless devices. Step 2060 includes steps 2062, 2064 and 2066.

In step 2062 the first service provider network management node scales data usage amounts (e.g., reported data usage amounts) included in the first set of CDCM records that correspond to the first wireless device by the first normalization factor. In step 2064 the first service provider network management node scales data usage amounts included in the first set of CDCM records that correspond to the second wireless device by the second normalization factor. In step 2066 the first service provider network management node scales data usage amounts included in the first set of CDCM records that correspond to the Nth wireless device by the Nth normalization factor. Operation proceeds from step 2060, via connecting node B 2068, to step 2070.

In step 2070 the first service provider network management node assigns data usage indicted by normalized CDCM data usage records to locations. Step 2070 includes steps 2072, 2074, and 2076. In step 2072 the first service provider management node assigns one or more normalized data usage records corresponding to the first wireless device in said first set to a first location indicated by a CDCM location record, e.g., a first CDCM location record, corresponding to the first wireless device. In some embodiments, the first CDCM location record is a location record corresponding to the first wireless device that follows, in time, a time of a data usage record corresponding to the first wireless device that is assigned to the first location. In step 2074 the first service provider management node assigns one or more normalized data usage records corresponding to the second wireless device in said first set to a second location indicated by a CDCM location record, e.g., a second CDCM location record, corresponding to the second wireless device. In some embodiments, the second CDCM location record is a location record corresponding to the second wireless device that follows, in time, a time of a data usage record corresponding to the second wireless device that is assigned to the second location. In step 2076 the first service provider management node assigns one or more normalized data usage records corresponding to the Nth wireless device in said first set to a Nth location indicated by a CDCM location record, e.g., a Nth CDCM location record, corresponding to the Nth wireless device. In some embodiments, the Nth CDCM location record is a location record corresponding to the Nth wireless device that follows, in time, a time of a data usage record corresponding to the Nth wireless device that is assigned to the Nth location.

In some embodiments, operation proceeds from step 2070 to step 2078. In other embodiments, operation proceeds from step 2070 to step 2080. In step 2078 the first service provider network management node removes from consideration data usage assigned to indoor locations. For example, in some embodiments optional step 2078 is included and used to exclude from consideration wireless data traffic which corresponds to a building location and will not be captured or serviced by an access point (e.g., CBRS device (CSDS base station)) which is to be deployed to service outdoor devices. Operation proceeds from step 2078 to step 2080.

In step 2080 the first service provider network management node assigns data usage amounts indicated by the normalized first set of CDCM usage records (e.g., data usage indicated by normalized data usage records) to geospatial areas, e.g., geospatial bins. In some embodiments, a geospatial area, sometimes referred to as geospatial bins, corresponds to a hexagonal grid area. Operation proceeds from step 2080 to step 2082.

In step 2082 the first service provider network management node scales, on a per geospatial area basis (e.g., a per geospatial bin basis), the sum of the data assigned to each individual geospatial area (e.g., geospatial bin) to adjust for non-CM client devices. In some embodiments, operation proceeds from step 2082 to step 2083. In some other embodiments operation proceeds from step 2082 to step 2084.

In step 2083 the first service provider network management node determines on a per geospatial area (e.g., geospatial bin) basis, data usage for additional time periods, e.g., additional days of the year. For example, step 2083 includes one or more iterations of step 2048, 2050, 2052, 2060, 2070, optionally 2078, 2080, and 2082 operations are performed. For example in one of the additional iterations of step 2083, a second set of client data usage records (e.g., second set of CDCM usage records 2030) and a second set of second service provider usage records (e.g., second set of service provider usage records 2042) corresponding to a second time period (e.g. day 2), are processed instead of the first set of client data usage records (e.g., first set of CDCM usage records 2028) and first set of second service provider usage records (e.g., first set of second service provider usage records) corresponding to the first time period (e.g., day 1). Operation proceeds from step 2083 to step 2084.

In step 2084 the first service provider network management node determines one or more wireless network device (e.g., access point such as Citizens Broadband Radio Services Device (CBSD) base station) placement location based on the assigned data usage to location information. Step 2084 includes steps 2086 and step 2088. In step 2086 the first service provider network management node generates, for each geospatial area (e.g., geospatial bin), a sum of the data assigned, e.g., scaled data assigned, to the individual geospatial area (e.g., geospatial bin). Operation proceeds from step 2086 to step 2088. In step 2088 the first service provider network management node identifies a geospatial area (e.g., geospatial bin) having a higher data sum assigned to it than another geospatial area (e.g., geospatial bin) as one of the wireless network device placement locations. Operation proceeds from step 2084 to step 2090.

In step 2090 the first service provider network management node deploys a wireless network device, e.g., a CBSD base station, at one of the determined wireless network device placement locations, e.g., generates instructions and/or a work order to deploy a wireless network device at one of the determined wireless network device placement locations.

Figure 21:
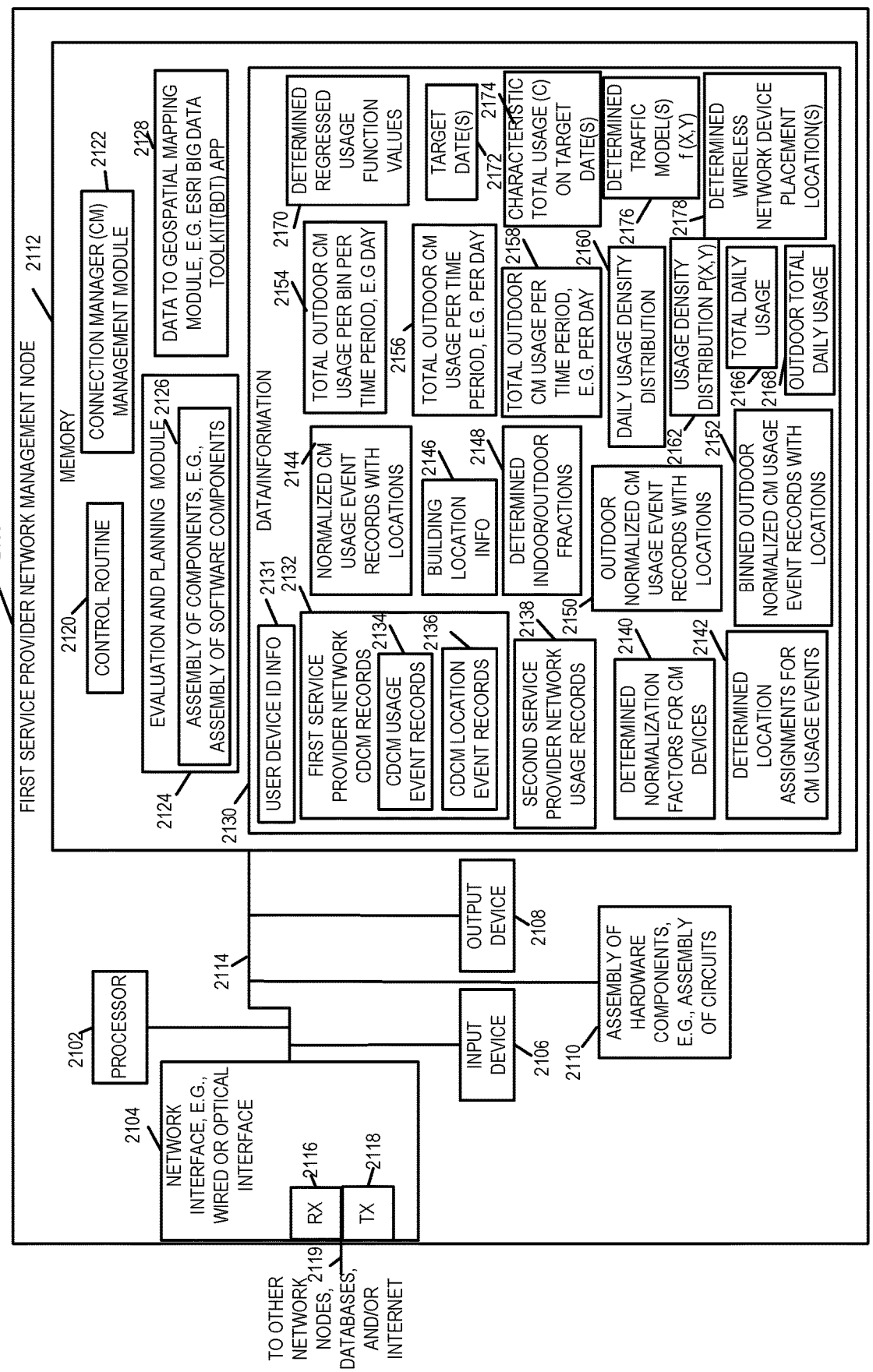
FIG. 21 is a drawing of an exemplary first service provider network management node in accordance with an exemplary embodiment.

FIG. 21 is a drawing of an exemplary first service provider network management node 2100 in accordance with an exemplary embodiment. Exemplary first service provider management node 2100 is, e.g., first service provider network management node 102 of FIG. 1 and/or a management node implementing steps of method 200 of flowchart 200 of FIG. 2 and/or steps of method of flowchart 2000 of FIG. 20.

Management node 2100 includes a processor 2102, e.g., a CPU, a network interface 2104, e.g., a wired or optical interface, a input device 2106, e.g., keyboard and/or mouse, an output device 2108, e.g., a display screen, an assembly of hardware components 2110, e.g., an assembly of circuits, and memory 2112 coupled together via a bus 2014 over which the various elements may interchange data and information. Network interface 2104 includes a receiver 2116 and a transmitter 2118 coupled to connection 2119, via which the management node 2100 is coupled to other network nodes, databases, and/or the Internet.

Memory 2112 includes a control routine 2120 for performing various operations such as controlling the input and output devices 2106, 2108, controlling basic RX/TX 2116, 2118 operations, controlling memory transfers, e.g., loading routines to be executed into processor 2102 from memory 2112, etc. Memory 2112 further includes a connection manager (CM) management module 2122 for interfacing with the CM modules in UE devices, e.g., android UE devices. Connection manager management module 2122 receives CM usage event reports for CM enabled UE devices and CM location event reports from CM enabled UE devices, processes received reports and stores the information, e.g., in a CM record storage database. Memory 2112 further includes an evaluation and planning module 2124. In some embodiments, the evaluation and planning module 2124 includes an assembly of components 2126, e.g., an assembly of software components, e.g., routines, sub-routines, applications, software modules. The evaluation and planning module 2124 uses and evaluates, e.g. in combination, data usage reports e.g. CDCM usage reports, from a first service provider network (e.g., a MVNO), and data usage reports from a second service provider network, e.g. a MNO network, which is a partner to the first service provider network, determines traffic usage at different locations, and determines one or more locations to deploy a network device, e.g. a CBSD base station, based on the determined traffic usage. Memory 2112 also includes a data to geospatial mapping module 2128, e.g., an ERSI big data toolkit (BDT) application, e.g., for mapping usage events locations to geospatial regions, e.g., geospatial bins.

Memory 2112 further includes data/information 2130. Data/information 2130 includes user device ID information, e.g. an International Mobile Equipment Identity (IMIE) identifier and a Connection Manage (CM)-identifier for each CM client device, e.g., each android UE device, and a IMIE identifier for each non-CM client device, e.g. an iOS UE device. Data/information 2130 further includes first service provider CDCM records 2132 including CDCM usage event records 2134 and CDCM location event records 2136, second service provider network usage records 2138, determined normalization factors for CM devices 2140, determined location assignments for CM usage events 2142, normalized CM usage event records with locations 2144, building location information 2146, determined indoor/outdoor usage fractions 2148, outdoor normalized CM usage event records with locations 2150, binned outdoor normalized CM usage event records with locations 2152, total outdoor CM usage per bin per time period, e.g., per day, information 2154, total outdoor CM usage per time period, e.g. per day, information 2156, determined daily usage density distributions 2160, a usage density distribution 2162, total daily usage information (based on both CM and non-CM devices) 2168, outdoor total daily usage information (based on both CM and non-CM devices) 2170, determined regressed usage function values 2170, target date(s) 2172, determined characteristic total usage for each of one or more target dates 2174, determined traffic model(s) t(X,Y), e.g. specifying traffic data usage for a specified time period at different locations, e.g. different geospatial areas (bins), and determined wireless network device placement location(s) 2178 based on the determined traffic modules, e.g. determined high traffic location(s) to place a CBSD base station(s).

Figure 22A:
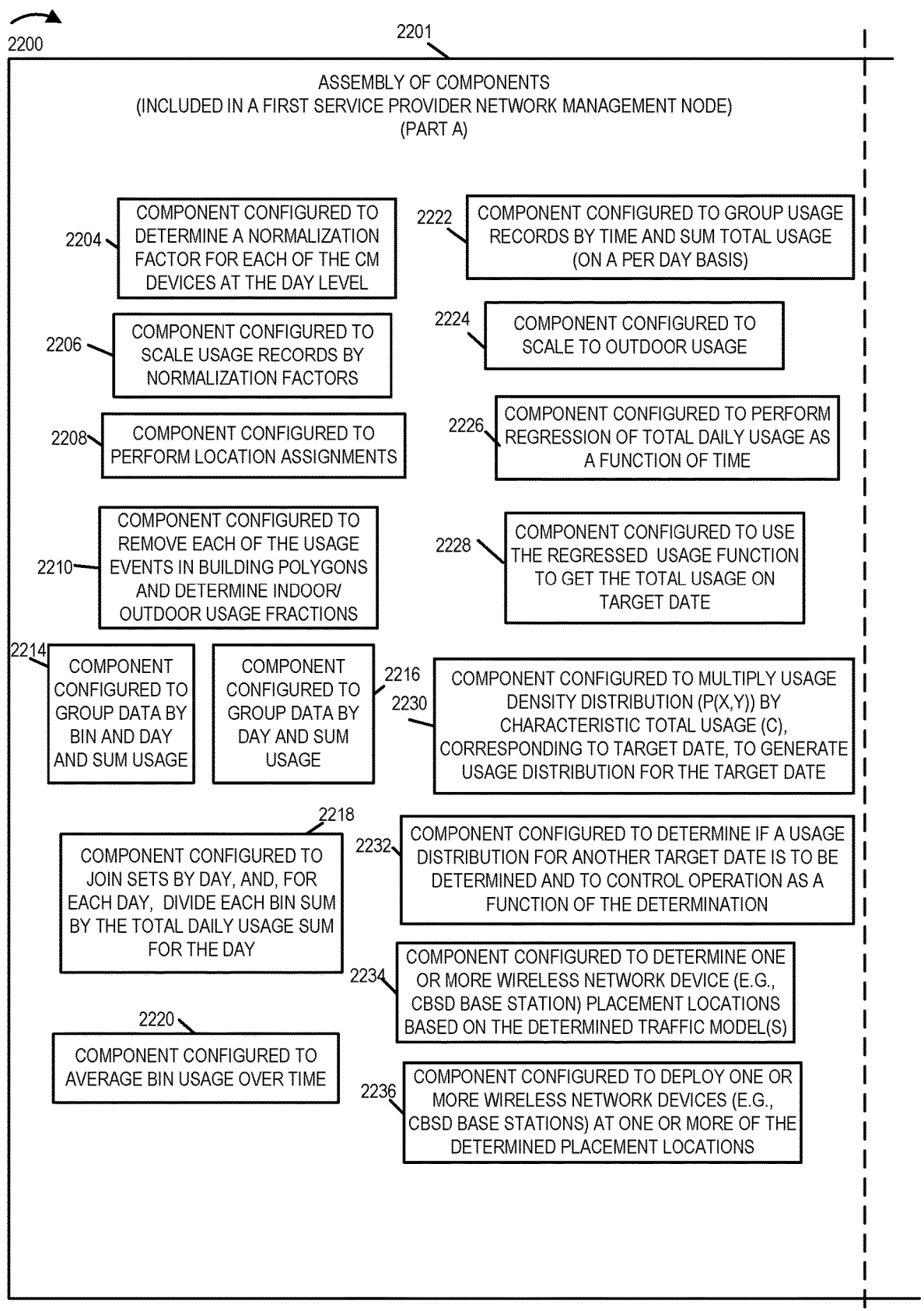
FIG. 22A is a first part of a drawing of an exemplary assembly of components which may be included in an exemplary first service provider network management node in accordance with an exemplary embodiment.
Figure 22B:
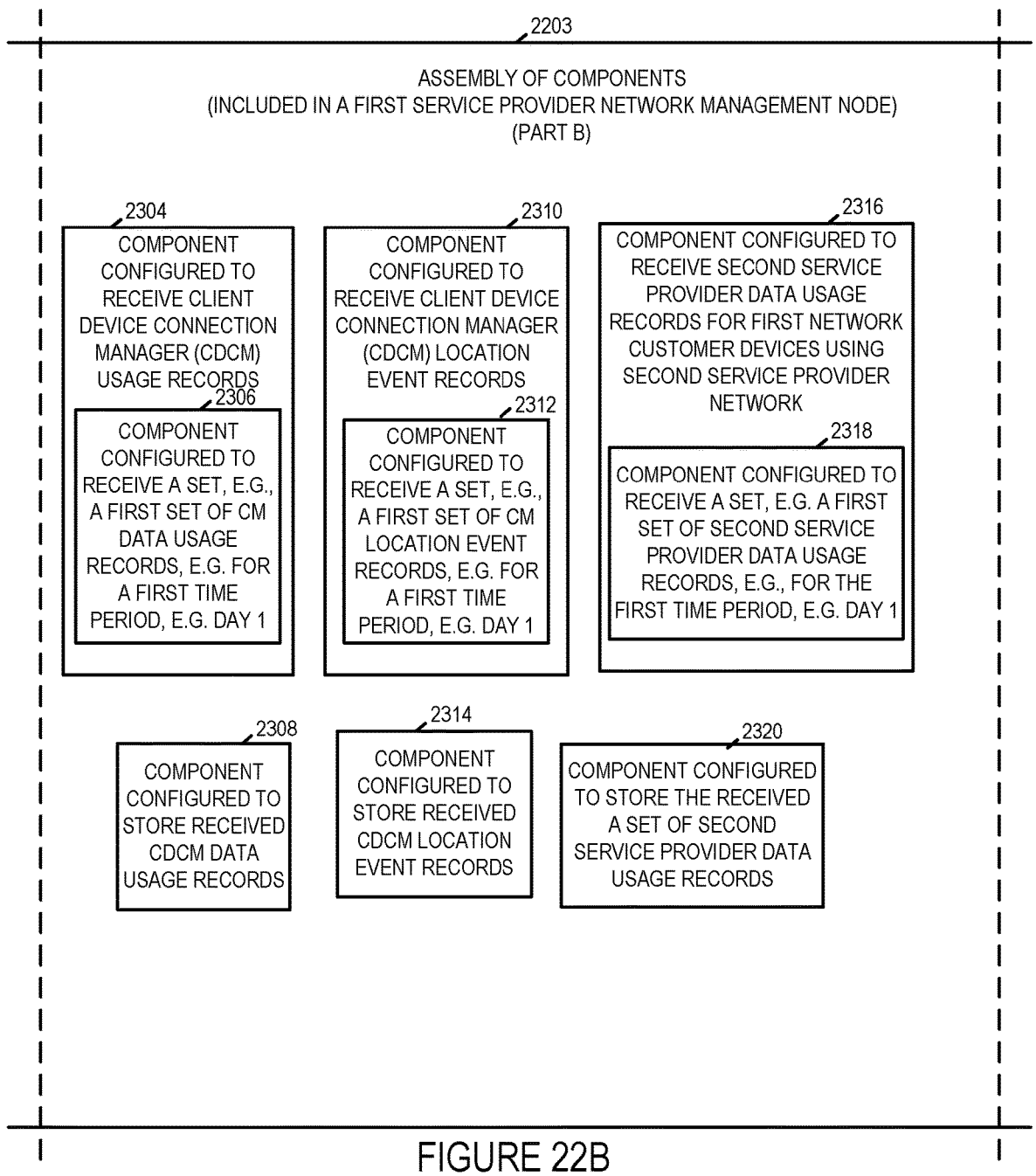
FIG. 22B is a second part of a drawing of an exemplary assembly of components which may be included in an exemplary first service provider network management node in accordance with an exemplary embodiment.
Figure 22C:
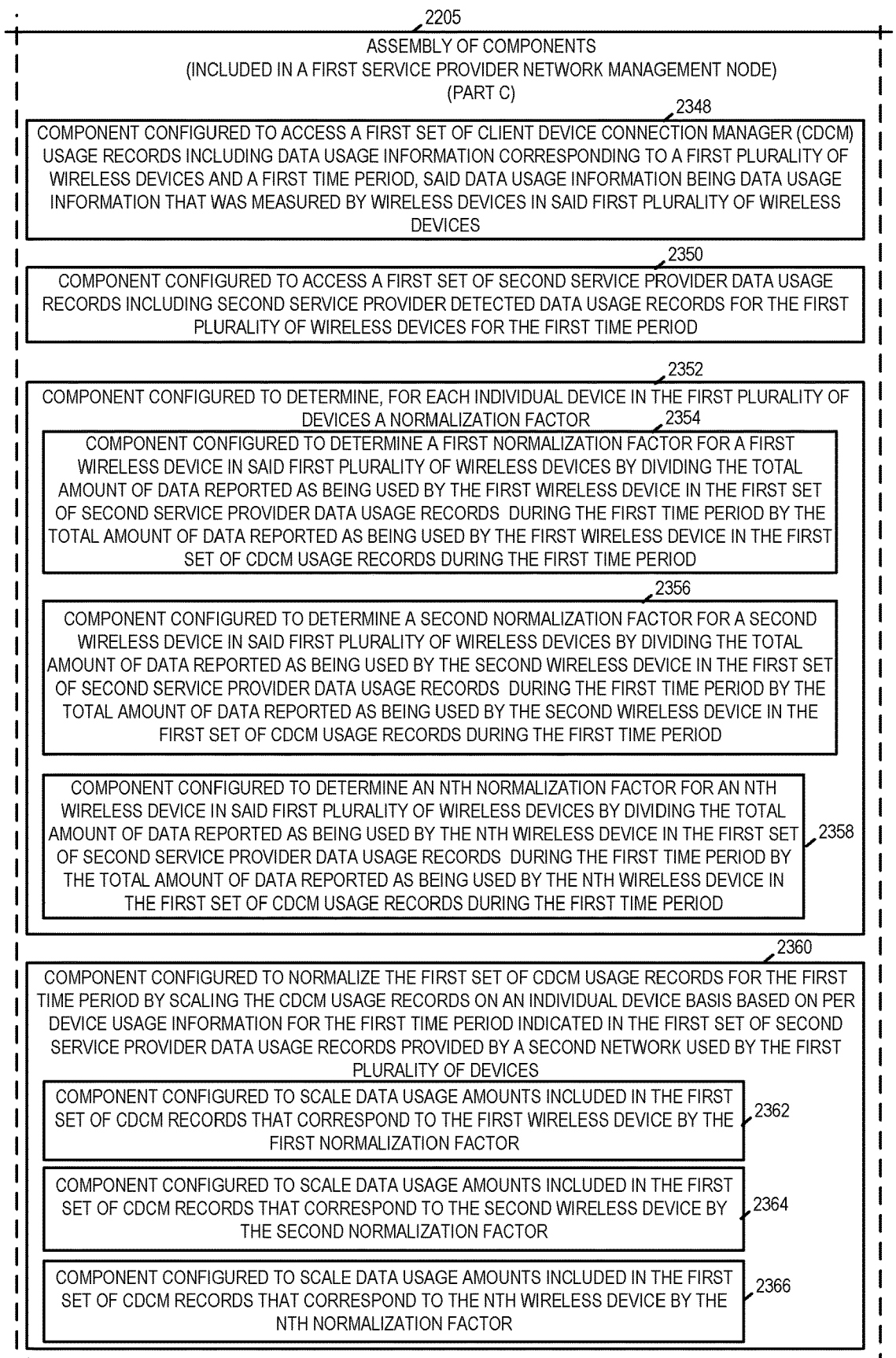
FIG. 22C is a third part of a drawing of an exemplary assembly of components which may be included in an exemplary first service provider network management node in accordance with an exemplary embodiment.

FIG. 22, comprising the combination of FIG. 22A, FIG. 22B, FIG. 22C and Figured 22D, is a drawing of an exemplary assembly of components 2200, comprising Part A 2201, Part B 2203, Part C 2205 and Part D 2207, in accordance with an exemplary embodiment. Exemplary assembly of components 2200 is, e.g., included in a first service provider network management node, e.g., first service provider network management node 102 of system 100 of FIG. 1, first service provider network management node 2100 of FIG. 21, a node implementing steps of the method of flowchart 200 of FIG. 2 and/or a node implementing steps of the method of flowchart 2000 of FIG. 20.

The components in the assembly of components 2200 can, and in some embodiments are, implemented fully in hardware within a processor, e.g., processor 2102, e.g., as individual circuits. The components in the assembly of components 2200 can, and in some embodiments are, implemented fully in hardware within the assembly of hardware components 2110, e.g., as individual circuits corresponding to the different components. In other embodiments some of the components are implemented, e.g., as circuits, within processor 2102 with other components being implemented, e.g., as circuits within assembly of components 2110, external to and coupled to the processor 2102. As should be appreciated the level of integration of components on the processor and/or with some components being external to the processor may be one of design choice. Alternatively, rather than being implemented as circuits, all or some of the components may be implemented in software and stored in the memory 2112 of the management node 2100, with the components controlling operation of management node 2100 to implement the functions corresponding to the components when the components are executed by a processor e.g., processor 2102. In some such embodiments, the assembly of components 2200 is included in the memory 2112 as part of an assembly of software components 2126. In still other embodiments, various components in assembly of components 2200 are implemented as a combination of hardware and software, e.g., with another circuit external to the processor providing input to the processor which then under software control operates to perform a portion of a component's function.

When implemented in software the components include code, which when executed by a processor, e.g., processor 2102, configure the processor to implement the function corresponding to the component. In embodiments where the assembly of components 2200 is stored in the memory 2112, the memory 2112 is a computer program product comprising a computer readable medium comprising code, e.g., individual code for each component, for causing at least one computer, e.g., processor 2102, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 2 control and/or configure the management node 2100 or elements therein such as the processor 2102, to perform the functions of corresponding steps illustrated and/or described in the method of one or more of the flowcharts, signaling diagrams and/or described with respect to any of the Figures. Thus, the assembly of components 2200 includes various components that perform functions of corresponding one or more described and/or illustrated steps of an exemplary method, e.g., steps of the method of flowchart 200 of FIG. 2 and/or steps of the method of flowchart 2000 of FIG. 20.

Assembly of components 2200 includes a component 2204 configured to determine a normalization factor for each of the CM devices at the day level, a component 2206 configured to scale usage records by normalization factors, a component 2208 configured to perform location assignments, e.g. to CM usage events, a component 2210 configured to remove each of the usage events determined to be in buildings, e.g. in building polygons, and to determine indoor/outdoor usage fractions, a component 2214 configured to group data by bin and day and sum usage, a component 2216 configured to group data by day and sum usage, a component 2218 configured to join set of data by day, and for each day, divide each bin sum by the total daily usage sum for the day, and a component 2220 configured to average bin usage over time, e.g., an obtain a usage density distribution P(X,Y).

Assembly of components 2200 further includes a component 2222 configured to group usage records by time and sum total usage, e.g., on a per day basis, a component 2224 configured to scale to outdoor usage, a component 2226 configured to perform regression of total daily usage as a function of time, a component 2228 configured to used the regressed usage function to get a characteristic total usage (C) on a target date. Assembly of components 2200 further includes a component 2230 configured to multiple the usage density distribution P(X,Y) by the characteristic total usage (C) corresponding to the target date, to generate usage distribution (traffic model) for the target date. Assembly of components 2200 further includes a component configured to determine if a usage distribution for another target date is to be determined and to control operation as a function of the determination, a component 2234 configured to determine one or more wireless network device (e.g., CBSD base station) placement locations based on the determined traffic model(s), and a component 2236 configured to deploy one or more wireless network devices (e.g., CBSD base stations) at one or more of the determined locations, e.g. generate and send instructions and/or a work order to deploy one or more wireless network devices at one or more of the determined locations, e.g. high traffic locations.

Assembly of components 2200 further includes a component 2304 configured to receive client device connection manager (CDCM) usage event records, a component 2310 configured to receive client device connection manager (CDCM) location event records, and a component 2316 configured to receive second service provider data usage records for first network customer devices using the second service provider network. Component 2304 includes a component 2306 configured to receive a set, e.g., a first set of CM data usage records, e.g., for a first time period, e.g., day 1. Component 2310 includes a component 2312 configured to receive a set, e.g., a first set of CM location event records, e.g., for the first time period, e.g., day 1. Component 2316 includes a component 2318 configured to receive a set, e.g., a first set of second service provider data usage records, e.g., for the first time period, e.g. day 1. Assembly of components 2200 further includes a component 2308 configured to store received CDCM data usage records, a component 2314 configured to store received CDCM location event records, and a component 2320 configured to store the received set of second service provider data usage records.

Assembly of components 2200 further includes a component 2348 configured to access a first set of client device connection manager (CDCM) usage records including data usage information corresponding to a first plurality of wireless devise and a first time period, said data usage information being data usage information that was measured by wireless devise in said first plurality of wireless devices, a component 2350 configured to access a first set of second service provider data usage records for the first plurality of wireless devise for the first time period, and a component 2352 configured to determine, for each individual device in the first plurality of wireless devices, a normalization factor. Component 2352 includes a component 2354 configured to determine a first normalization factor for a first wireless device in said plurality of wireless devices by dividing the total amount of data reported as being used by the first wireless device in the first set of second service provider data usage records during the first time period by the total amount of data reported as being used by the first wireless device in the first set of CDCM usage records during the first time period, a component 2356 configured to determine a second normalization factor for a second wireless device in said plurality of wireless devices by dividing the total amount of data reported as being used by the second wireless device in the first set of second service provider data usage records during the first time period by the total amount of data reported as being used by the second wireless device in the first set of CDCM usage records during the first time period, and a component 2358 configured to determine an Nth normalization factor for a Nth wireless device in said plurality of wireless devices by dividing the total amount of data reported as being used by the Nth wireless device in the first set of second service provider data usage records during the first time period by the total amount of data reported as being used by the Nth wireless device in the first set of CDCM usage records during the first time period.

Assembly of components 2200 further includes a component 2360 configured to normalize the first set of CDCM usage records for the first time period by scaling the CDCM usage records on an individual basis based on per device usage information for the first time period indicated in the first set of second service provider data usage records provided by a second network used by the first plurality of wireless devices. Component 2360 includes a component 2362 configured to scale data usage amounts included in the first set of CDCM records that correspond to the first wireless device by the first normalization factor, a component 2364 configured to scale data usage amounts included in the first set of CDCM records that correspond to the second wireless device by the second normalization factor, and a component 2366 configured to scale data usage amounts included in the first set of CDCM records that correspond to the Nth wireless device by the Nth normalization factor.

Assembly of components 2200 further includes a component 2370 configured to assign data usage indicated by the normalized CDCM data usage records to locations. Component 2370 includes a component 2372 configured to assign one or more data usage corresponding to the first wireless device in said first set to a first location indicated by a CDCM location record, e.g. a first CDCM location record, corresponding to the first wireless device, a component 2374 configured to assign one or more data usage corresponding to the second wireless device in said first set to a second location indicated by a CDCM location record, e.g. a second CDCM location record, corresponding to the second wireless device, and a component 2376 configured to assign one or more data usage corresponding to the Nth wireless device in said first set to a Nth location indicated by a CDCM location record, e.g. a Nth CDCM location record, corresponding to the Nth wireless device.

Assembly of components 2200 further includes a component 2378 configured to remove from consideration data usage assigned to indoor locations, a component 2380 configured to assign data usage amounts indicated by the normalized first set of CDCM usage records to geospatial areas, e.g., geospatial bins, a component 2382 configured to scale on a per geospatial area (geospatial bin) basis, the sum of the data assigned to each individual geospatial area (e.g., geospatial bin) to adjust for non-CM client devices, a component 2383 configured to optionally determine on per geospatial area (geospatial bin) basis, data usage for additional time periods, e.g. additional days of the year.

Assembly of components 2200 further includes a component 2384 configured to determine one or more wireless network device (e.g., CBSD base station) placement locations based on the assigned data usage to location information. Component 2384 includes a component 2386 configured to, for each geospatial area (e.g., geospatial bin) generate a sum of the data assigned to the individual geospatial area (e.g., geospatial bin) and a component 2388 configured to identify a geospatial area (e.g. geospatial bin) having a higher assigned data sum to it than another geospatial are (e.g. geospatial bin) as one of the wireless network device placement location. Assembly of components 2200 further includes a component 2390 configured to deploy a wireless network device (e.g., a CBSD base station) at one of the determined wireless network device placement locations, e.g. generate and send instructions and/or a work order, e.g., to a installation service crew member or supervisor, to deploy a wireless network device (e.g., CBSD base station) at one of the determined wireless network device placement locations.

NUMBERED LIST OF EXEMPLARY METHOD EMBODIMENTS

Method Embodiment 1. A method of method of using wireless data usage information from a variety of sources, the method comprising: accessing (2048) a first set of client device connection manager data (CDCM) usage records including data usage information corresponding to a first plurality of wireless devices and a first time period, said data usage information being data usage information that was measured by wireless devices in said first plurality of wireless devices (e.g., where the first plurality of wireless devices are CM enabled device which execute a connection manager (CM) application and report device usage data upon the occurrence of a CM usage event and which report device location information upon occurrence of a device location event and where in some embodiments the first time period is a day); normalizing (2060) the first set of CDCM usage records for the first time period by scaling the CDCM usage records on an individual device basis based on per device usage information for the first time period indicated in a first set of second service provider data usage records provided by a second network used by the first plurality of devices; assigning (2070) data usage indicated by the normalized CDCM data usage records to locations; determining (2084) one or more wireless network device (e.g., an access point such as a CBRS device (CBSD) base station) placement locations based on the assigned data usage to location information; and deploying (2090) a wireless network device at one of the determined wireless network device placement locations.

Method Embodiment 1AA The method of Method Embodiment 1, further comprising: confirming, through network testing, successful deployment of a base station after installation at a determined location (e.g., operate the network management device to implement an automated test procedure to check for messages and/or signals from the wireless network device, e.g., access point which was to be deployed and/or to make sure that one or more other devices in the network, e.g., client devices, are able to use the deployed hardware).

Method Embodiment 1A. The method of Method Embodiment 1, wherein said first set of client device connection manager usage records are first service provider records.

Method Embodiment 2. The method of Method Embodiment 1, further comprising: accessing (2050), prior to normalizing (2060) the first set of CDCM usage records for the first time interval, the first set of second service provider data usage records including second service provider detected data usage records for said first plurality of wireless devices for the first time period (e.g., access second service provider records indicating data usage detected by the second service provider network on a per device basis during the first time period, e.g., the same day to which the first set of client device CM data usage records correspond); determining (2052), for each individual device in the first plurality of wireless devices, a per device normalization factor, said step of determining (2052) a per device normalization factor including determining (2054) a first normalization factor for a first wireless device in said first plurality of wireless devices by dividing the total amount of data reported as being used by the first wireless device in the first set of second service provider data usage records during the first time period by the total amount of data reported as being used by the first wireless device in the first set of CDCM usage records during the first time period.

Method Embodiment 3. The method of Method Embodiment 2, wherein normalizing (2060) the first set of CDCM usage records for the first time period includes: scaling (2062) data usage amounts (e.g., reported data usage amounts) included in the first set of CDCM records that correspond to the first wireless device by the first normalization factor.

Method Embodiment 4. The method of Method Embodiment 3, wherein said step of determining (2052) a per device normalization factor further includes determining (2056) a second normalization factor for a second wireless device in said first plurality of wireless devices by dividing the total amount of data reported as being used by the second wireless device in the first set of second service provider data usage records during the first time period by the total amount of data reported as being used by the second wireless device in the first set of CDCM usage records during the first time period; and wherein normalizing (2060) the first set of CDCM usage records for the first time period includes: scaling (2064) data usage amounts (e.g., reported data usage amounts) included in the first set of CDCM records that correspond to the second wireless device by the second normalization factor.

Method Embodiment 5. The method of Method Embodiment 3, wherein assigning (2070) data usage indicated by the normalized management data usage records to locations includes: assigning (2072) data usage indicated by one or more normalized data usage records corresponding to the first wireless device in said first set to a first location indicated by a first CDCM location record corresponding to the first wireless device.

Method Embodiment 6. The method of Method Embodiment 5, wherein the first CDCM location record is a location record corresponding to the first wireless device that follows, in time, a time of a data usage record corresponding to the first wireless device that is assigned to the first location.

Method Embodiment 7. The method of Method Embodiment 2, further comprising: assigning (2080) data usage amounts indicated by the normalized first set of CDCM usage records (e.g., data usage indicated by normalized data usage records) to geospatial areas (e.g., referred to as geospatial bins where each bin may, and sometimes does, corresponding to a hexagonal grid area).

Method Embodiment 8. The method of Method Embodiment 7, wherein determining (2084) one or more wireless network device placement locations based on the assigned data usage to location information includes: for each individual geospatial area (e.g., geospatial bin) generating (2086) a sum of the data assigned to individual geospatial area (e.g., geospatial bin); and identifying (2088) a geospatial area (e.g., geospatial bin) having a higher data sum assigned to it than another geospatial area (e.g., geospatial bin) as one of the wireless network device placement locations.

Method Embodiment 9. The method of Method Embodiment 8, further comprising: prior to determining (2084) one or more wireless network device (e.g., access point such as a CBSD base station) placement locations, removing (2078) from consideration data usage assigned to indoor locations (for example in some embodiments this is used as an optional step to exclude from consideration wireless data traffic which corresponds to a building location and will not be captured or serviced by an access point (e.g., CBRS device (CSDS base station)) which is to be deployed to service outdoor devices).

Method Embodiment 10. The method of Method Embodiment 9, wherein the first set of second service provider data usage records provided by the second network includes data records corresponding to devices which do not support a connection manager application used to report connection manager client usage data records (e.g., non-CM client devices such as iOS devices) in addition to the first plurality of wireless devices which do provide CMCD usage records (e.g., CM client devices such and Android devices including a CM application), the method further comprising: scaling (2082), on a per geospatial area (e.g. geospatial bin) basis, the sum of the data assigned to each individual geospatial area (e.g., geospatial bin), to adjust for non-CM client devices.

NUMBERED LIST OF EXEMPLARY APPARATUS EMBODIMENTS

Apparatus Embodiment 1. A network management device, comprising: memory storing a first set of client device connection manager data (CDCM) usage records including data usage information corresponding to a first plurality of wireless devices and a first time period, said data usage information being data usage information that was measured by wireless devices in said first plurality of wireless devices (e.g., where the first plurality of wireless devices are CM enabled device which execute a connection manager (CM) application and report device usage data upon the occurrence of a CM usage event and which report device location information upon occurrence of a device location event and where in some embodiments the first time period is a day); and a processor configured to control the management device to: normalize (2060) the first set of CDCM usage records for the first time period by scaling the CDCM usage records on an individual device basis based on per device usage information for the first time period indicated in a first set of second service provider data usage records provided by a second network used by the first plurality of devices; assign (2070) data usage indicated by the normalized CDCM data usage records to locations; determine (2084) one or more wireless network device (e.g., an access point such as a CBRS device (CBSD) base station) placement locations based on the assigned data usage to location information; and control (e.g., schedule and/or deploy or issue an automated order to cause one or more technicians to install hardware, e.g., a base station at the determined wireless network device placement location) wireless network hardware deployment at one or more of the determined one or more wireless network device placement locations.

Apparatus Embodiment 1AA. The network management device of Apparatus Embodiment 1, wherein the processor is further configured to: confirm, through network testing, successful deployment of a base station after installation at a determined location.

Apparatus Embodiment 1A. The network management device of Apparatus Embodiment 1, wherein said first set of client device connection manager usage records are first service provider records.

Apparatus Embodiment 2. The network management device of Apparatus Embodiment 1, wherein the processor is further configured to: access (2050), prior to normalizing (2060) the first set of CDCM usage records for the first time interval, the first set of second service provider data usage records including second service provider detected data usage records for said first plurality of wireless devices for the first time period (e.g., access second service provider records indicating data usage detected by the second service provider network on a per device basis during the first time period, e.g., the same day to which the first set of client device CM data usage records correspond); determine (2052), for each individual device in the first plurality of wireless devices, a per device normalization factor, said determining (2052) a per device normalization factor including determining (2054) a first normalization factor for a first wireless device in said first plurality of wireless devices by dividing the total amount of data reported as being used by the first wireless device in the first set of second service provider data usage records during the first time period by the total amount of data reported as being used by the first wireless device in the first set of CDCM usage records during the first time period.

Apparatus Embodiment 3. The network management device of Apparatus Embodiment 2, wherein the processor, as part of being configured to normalize (2060) the first set of CDCM usage records for the first time period is configured to: scale (2062) data usage amounts (e.g., reported data usage amounts) included in the first set of CDCM records that correspond to the first wireless device by the first normalization factor.

Apparatus Embodiment 4. The network management device of Apparatus Embodiment 3, wherein the processor, as part of being configured to determine (2052) a per device normalization factor is configured to determine (2056) a second normalization factor for a second wireless device in said first plurality of wireless devices by dividing the total amount of data reported as being used by the second wireless device in the first set of second service provider data usage records during the first time period by the total amount of data reported as being used by the second wireless device in the first set of CDCM usage records during the first time period; and wherein the processor is configured, as part of being configured to normalize (2060) the first set of CDCM usage records for the first time period, is configured to: scale (2064) data usage amounts (e.g., reported data usage amounts) included in the first set of CDCM records that correspond to the second wireless device by the second normalization factor.

Apparatus Embodiment 5. The network management device of Apparatus Embodiment 3, wherein the processor is configured, as part of being configured to assign (2070) data usage indicated by the normalized management data usage records to locations, to: assign (2072) data usage indicated by one or more normalized data usage records corresponding to the first wireless device in said first set to a first location indicated by a first CDCM location record corresponding to the first wireless device.

Apparatus Embodiment 6. The network management device of Apparatus Embodiment 5, wherein the first CDCM location record is a location record corresponding to the first wireless device that follows, in time, a time of a data usage record corresponding to the first wireless device that is assigned to the first location.

Apparatus Embodiment 7. The network management device of Apparatus Embodiment 2, wherein the processor is configured to: assign (2080) data usage amounts indicated by the normalized first set of CDCM usage records (e.g., data usage indicated by normalized data usage records) to geospatial areas (e.g. referred to as geospatial bins where each bin may, and sometimes does, corresponding to a hexagonal grid area).

Apparatus Embodiment 8. The network management device of Apparatus Embodiment 7, wherein the processor is configured as part of being configured to determine (2084) one or more wireless network device placement locations based on the assigned data usage to location information to: generate (2086), for each individual geospatial area (e.g., geospatial bin), a sum of the data assigned to individual geospatial area (e.g., geospatial bin); and identify (2088) a geospatial area (e.g., geospatial bin) having a higher data sum assigned to it than another geospatial area (e.g., geospatial bin) as one of the wireless network device placement locations.

Apparatus Embodiment 9. The network management device of Apparatus Embodiment 8, wherein the processor is further configured to: remove (2078), prior to determining (2084) one or more wireless network device (e.g., access point such as a CBSD base station) placement locations, from consideration data usage assigned to indoor locations (for example in some embodiments this is used as an optional step to exclude from consideration wireless data traffic which corresponds to a building location and will not be captured or serviced by an access point (e.g., CBRS device (CSDS base station)) which is to be deployed to service outdoor devices).

Apparatus Embodiment 10. The network management device of Apparatus Embodiment 9, wherein the first set of second service provider data usage records provided by the second network includes data records corresponding to devices which do not support a connection manager application used to report connection manager client usage data records (e.g., non-CM client devices such as iOS devices) in addition to the first plurality of wireless devices which do provide CMCD usage records (e.g., CM client devices such and Android devices including a CM application), and wherein the processor is further configured to: scale (2082), on a per geospatial area (e.g. geospatial bin) basis, the sum of the data assigned to each individual geospatial area (e.g., geospatial bin), to adjust for non-CM client devices.

NUMBERED LIST OF NON-TRANSITORY COMPUTER

Readable Medium Embodiments

Non-Transitory Computer Readable Medium Embodiment 1. A non-transitory computer readable medium having processor executable instructions stored thereon which when executed by a processor of a network management device control the network management device to: access (2048) a first set of client device connection manager data (CDCM) usage records including data usage information corresponding to a first plurality of wireless devices and a first time period, said data usage information being data usage information that was measured by wireless devices in said first plurality of wireless devices (e.g., where the first plurality of wireless devices are CM enabled device which execute a connection manager (CM) application and report device usage data upon the occurrence of a CM usage event and which report device location information upon occurrence of a device location event and where in some embodiments the first time period is a day); normalize (2060) the first set of CDCM usage records for the first time period by scaling the CDCM usage records on an individual device basis based on per device usage information for the first time period indicated in a first set of second service provider data usage records provided by a second network used by the first plurality of devices; assign (2070) data usage indicated by the normalized CDCM data usage records to locations; determine (2084) one or more wireless network device (e.g., an access point such as a CBRS device (CBSD) base station) placement locations based on the assigned data usage to location information; and control (e.g., schedule and/or trigger deployment of one or more people to install hardware, e.g., a base station at the determined wireless network device placement location) wireless network hardware deployment at one or more of the determined one or more wireless network device placement locations.

Various embodiments are directed to apparatus, e.g., network management nodes, access points (APs), e.g., WiFi APs, base stations such as NRU gNB base stations, etc., user devices such as stations (STAs), e.g., WiFi STAs, user equipment (UE) devices, LTE LAA devices, various types of RLAN devices, etc., other network communications devices such as routers, switches, etc., mobile network operator (MNO) base stations (macro cell base stations and small cell base stations) such as a Evolved Node B (eNB), gNB or ng-eNB, mobile virtual network operator (MVNO) base stations such as Citizens Broadband Radio Service Devices (CBSDs), network nodes, MNO and MVNO HSS devices, relay devices, e.g. mobility management entities (MMEs), a Spectrum Access System (SAS), an AFC system, an Access and Mobility Management Function (AMF) device, servers, customer premises equipment devices, cable systems, network nodes, gateways, cable headend and/or hubsites, network monitoring nodes and/or servers, cluster controllers, cloud nodes, production nodes, cloud services servers and/or network equipment devices. Various embodiments are also directed to methods, e.g., method of controlling and/or operating a network management node, access points (APs), e.g., WiFi APs, base stations such as NRU gNB base stations, etc., user devices such as stations (STAs), e.g., WiFi STAs, user equipment (UE) devices, LTE LAA devices, various types of RLAN devices, network communications devices such as routers, switches, etc., user devices, base stations, e.g., eNB and CBSDs, gateways, servers (HSS server), MMEs, SAS, an AFC system, cable networks, cloud networks, nodes, servers, cloud service servers, customer premises equipment devices, controllers, network monitoring nodes and/or servers and/or cable or network equipment devices. Various embodiments are directed to communications network which are partners, e.g., a MVNO network and a MNO network. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements are steps are implemented using hardware circuitry.

In various embodiments nodes and/or elements described herein are implemented using one or more components to perform the steps corresponding to one or more methods, for example, message reception, message generation, signal generation, signal processing, sending, comparing, determining and/or transmission steps. Thus, in some embodiments various features are implemented using components or in some embodiment's logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a network management device, an access points (AP), e.g., WiFi AP, base stations such as NRU gNB base station, etc., a user device such as a station (STA), e.g., WiFi STA, a user equipment (UE) device, LTE LAA device, etc., an RLAN device, other network communications devices a network communications device such as router, switch, etc., a MVNO base station such as a CBRS base station, e.g., a CBSD, a device such as a cellular base station e.g., an eNB, a MNO HSS server, a MVNO HSS server, a UE device, a relay device, e.g. a MME, SAS, a AFC system, etc., said device including a processor configured to implement one, multiple or all of the steps of one or more methods of the invention.

In some embodiments, the processor or processors, e.g., CPUs, of one or more devices, e.g., a network management device, communications nodes such as e.g., access points (APs), e.g., WiFi APs, base stations such as NRU gNB base stations, etc., user devices such as stations (STAs), e.g., WiFi STAs, user equipment (UE) devices, LTE LAA devices, etc., various RLAN devices, network communications devices such as routers, switches, etc., a MVNO base station such as a CBRS base station, e.g. a CBSD, an device such as a cellular base station e.g., an eNB, a MNO HSS server, a MVNO HSS device server, a UE device, a relay device, e.g. a MME, a SAS, a AFC system, are configured to perform the steps of the methods described as being performed by the communications nodes, e.g., controllers. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., a network management device, an access points (AP), e.g., WiFi AP, a base station such as NRU gNB base station, etc., a user device such as station (STA), e.g., WiFi STA, a user equipment (UE) device, an LTE LAA device, etc., a RLAN device, a network communications device such as router, switch, etc., administrator device, security device, a MVNO base station such as a CBRS base station, e.g. a CBSD, an device such as a cellular base station e.g., an eNB, a MNO HSS server, a MVNO HSS device server, a UE device, a relay device, e.g. a MME, includes a component corresponding to each of one or more of the steps of the various described methods performed by the device in which the processor is included. In some but not all embodiments a device, e.g., a communications node such as e.g., network management device, an access points (AP), e.g., WiFi AP, a base station such as NRU gNB base station, etc., a user device such as a station (STA), e.g., WiFi STA, a user equipment (UE) device, a LTE LAA device, a RLAN device, a router, switch, etc., administrator device, security device, a AFC system, a MVNO base station such as a CBRS base station, e.g., a CBSD, a device such as a cellular base station e.g., an eNB, an MNO HSS server, a MVNO HSS device server, a UE device, a relay device, e.g. a MME, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g., one or more steps described above.

Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a network management node or device, a communications device such as a communications nodes such as e.g., an access point (AP), e.g., WiFi AP, a base station such as NRU gNB base station, etc., a user device such as a station (STA), e.g., WiFi STA, a user equipment (UE) device, a LTE LAA device, etc., an RLAN device, a network communications device such as router, switch, etc., administrator device, security device, a AFC system, MNVO base station, e.g., a CBSD, an MNO cellular base station, e.g., an eNB or a gNB, a HSS server, a UE device, a SAS or other device described in the present application. In some embodiments, components are implemented as hardware devices in such embodiments the components are hardware components. In other embodiments components may be implemented as software, e.g., a set of processor or computer executable instructions. Depending on the embodiment the components may be all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of using wireless data usage information from a variety of sources, the method comprising:
normalizing a first set of client device connection manager (CDCM) data usage records, including usage information collected by wireless devices, by scaling the CDCM data usage records on an individual device basis based on per device usage information for a first time period indicated in a first set of service provider data usage records provided by a network used by the wireless devices;
assigning data usage, indicated by the normalized first set of CDCM data usage records, to locations; and determining one or more wireless network device placement locations based on the assigned data usage to location information.

2. The method of claim 1, further comprising:
accessing, prior to normalizing the first set of CDCM data usage records for the first time period, the first set of service provider data usage records including service provider detected data usage records for said first plurality of wireless devices for the first time period.

3. The method of claim 2, further comprising:
determining, for each individual device in the first plurality of wireless devices, a per device normalization factor, said step of determining a per device normalization factor including determining a first normalization factor for a first wireless device in said first plurality of wireless devices by dividing the total amount of data reported as being used by the first wireless device in the first set of service provider data usage records during the first time period by the total amount of data reported as being used by the first wireless device in the first set of CDCM data usage records during the first time period.

4. The method of claim 3, wherein normalizing the first set of CDCM data usage records for the first time period includes:
scaling data usage amounts included in the first set of CDCM data usage records that correspond to the first wireless device by the first normalization factor.

5. The method of claim 4,
wherein said step of determining a per device normalization factor further includes determining a second normalization factor for a second wireless device in said first plurality of wireless devices by dividing the total amount of data reported as being used by the second wireless device in the first set of service provider data usage records during the first time period by the total amount of data reported as being used by the second wireless device in the first set of CDCM data usage records during the first time period; and
wherein normalizing the first set of CDCM data usage records for the first time period includes:
scaling data usage amounts included in the first set of CDCM data usage records that correspond to the second wireless device by the second normalization factor.

6. The method of claim 4, wherein assigning data usage indicated by the normalized first set of CDCM data usage records to locations includes:
assigning data usage indicated by one or more normalized data usage records corresponding to the first wireless device in said first set of CDCM data usage records to a first location indicated by a first CDCM location record corresponding to the first wireless device.

7. The method of claim 1, further comprising:
assigning data usage amounts indicated by the normalized first set of CDCM data usage records to geospatial areas.

8. The method of claim 7, wherein determining one or more wireless network device placement locations based on the assigned data usage to location information includes:
for each individual geospatial area generating a sum of the data assigned to individual geospatial area; and
identifying a geospatial area having a higher data sum assigned to it than another geospatial area as one of the wireless network device placement locations.

9. The method of claim 8, further comprising:
prior to determining one or more wireless network placement locations, removing from consideration data usage assigned to indoor locations.

10. The method of claim 9, wherein the first set of service provider data usage records includes data records corresponding to devices which do not support a connection manager (CM) application used to report CDCM data usage records in addition to the first plurality of wireless devices which do provide CDCM data usage records, the method further comprising:
scaling, on a per geospatial area basis, the sum of the data assigned to each individual geospatial area, to adjust for non-CM client devices.

11. A network management device, comprising:
memory storing a first set of client device connection manager (CDCM) data usage records; and
a processor configured to control the network management device to:
normalize the first set of CDCM data usage records for a first time period by scaling the CDCM data usage records on an individual device basis based on per device usage information for the first time period indicated in a first set of service provider data usage records provided by a network used by the first plurality of devices;
assign data usage, indicated by the normalized first set of CDCM data usage records, to locations; and
determine one or more wireless network device placement locations based on the assigned data usage to location information.

12. The network management device of claim 11, wherein the processor is further configured to:
access, prior to normalizing the first set of CDCM data usage records for the first time period, the first set of service provider data usage records including service provider detected data usage records for said first plurality of wireless devices for the first time period.

13. The network management device of claim 12, wherein the processor is further configured to:
determine, for each individual device in the first plurality of wireless devices, a per device normalization factor, said determining a per device normalization factor including determining a first normalization factor for a first wireless device in said first plurality of wireless devices by dividing the total amount of data reported as being used by the first wireless device in the first set of service provider data usage records during the first time period by the total amount of data reported as being used by the first wireless device in the first set of CDCM data usage records during the first time period.

14. The network management device of claim 13, wherein the processor, as part of being configured to normalize the first set of CDCM data usage records for the first time period, is configured to:
scale data usage amounts included in the first set of CDCM data usage records that correspond to the first wireless device by the first normalization factor.

15. The network management device of claim 14,
wherein the processor, as part of being configured to determine a per device normalization factor, is configured to determine a second normalization factor for a second wireless device in said first plurality of wireless devices by dividing the total amount of data reported as being used by the second wireless device in the first set of service provider data usage records during the first time period by the total amount of data reported as being used by the second wireless device in the first set of CDCM data usage records during the first time period; and wherein the processor is configured, as part of being configured to normalize the first set of CDCM data usage records for the first time period, to:

scale data usage amounts included in the first set of CDCM data usage records that correspond to the second wireless device by the second normalization factor.

16. The network management device of claim 14, wherein the processor is configured, as part of being configured to assign data usage indicated by the normalized first set of CDCM data usage records to locations, to:

assign data usage indicated by one or more normalized data usage records corresponding to the first wireless device in said first set to a first location indicated by a first CDCM location record corresponding to the first wireless device.

17. The network management device of claim 16, wherein the first CDCM location record is a location record corresponding to the first wireless device that follows, in time, a time of a data usage record corresponding to the first wireless device that is assigned to the first location.

18. The network management device of claim 12, wherein the processor is configured to:

assign data usage amounts indicated by the normalized first set of CDCM data usage records to geospatial areas.

19. The network management device of claim 18, wherein the processor is configured, as part of being configured to determine one or more wireless network device placement locations based on the assigned data usage to location information, to:

generate, for each individual geospatial area, a sum of the data assigned to individual geospatial area;

identify a geospatial area having a higher data sum assigned to it than another geospatial area as one of the wireless network device placement locations; and remove, prior to determining one or more wireless network device placement locations, from consideration data usage assigned to indoor locations.

20. A non-transitory computer readable medium having processor executable instructions stored thereon which when executed by a processor of a network management device control the network management device to:

normalize a first set of client device connection manager (CDCM) data usage records for a first time period by scaling the CDCM data usage records on an individual device basis based on per device usage information for the first time period indicated in a first set of service provider data usage records provided by a network used by the first plurality of devices;

assign data usage indicated by the normalized first set of CDCM data usage records to locations; and determine one or more wireless network device placement locations based on the assigned data usage to location information.

* * * * *